(12) United States Patent
Koos et al.

(10) Patent No.: US 10,437,789 B2
(45) Date of Patent: Oct. 8, 2019

(54) SYSTEM AND METHOD FOR DELETE FENCING DURING SYNCHRONIZATION OF REMOTE AND LOCAL FILE SYSTEMS

(71) Applicant: Egnyte, Inc., Mountain View, CA (US)

(72) Inventors: Remus Koos, San Jose, CA (US); Ravi Wijayaratne, San Jose, CA (US); Manish Marathe, San Jose, CA (US); Ray White, San Jose, CA (US); Dmitry Tisnek, Poznan (PL); Roman Levin, Poznan (PL); Harikesavan Krishnan, San Jose, CA (US); Hakan Ancin, Los Gatos, CA (US); Purvi Talati, Santa Clara, CA (US)

(73) Assignee: Egnyte, Inc., Mountain View, CA (US)

( * ) Notice: Subject to any disclaimer, the term of this patent is extended or adjusted under 35 U.S.C. 154(b) by 531 days.

(21) Appl. No.: 15/093,909

(22) Filed: Apr. 8, 2016

(65) Prior Publication Data

US 2016/0299917 A1    Oct. 13, 2016

Related U.S. Application Data

(60) Provisional application No. 62/145,637, filed on Apr. 10, 2015.

(51) Int. Cl.
*G06F 16/178* (2019.01)
(52) U.S. Cl.
CPC .................................. *G06F 16/178* (2019.01)
(58) Field of Classification Search
CPC ........... G06F 17/30575; G06F 11/2064; G06F 17/30371; G06F 16/178; G06F 16/27; G06F 16/275

See application file for complete search history.

(56) References Cited

U.S. PATENT DOCUMENTS 5,388,255 A  2/1995  Pytlik et al.
5,600,834 A  2/1997  Howard
(Continued)

FOREIGN PATENT DOCUMENTS

WO    WO 2016/014592 A1    1/2016

OTHER PUBLICATIONS

WebSocket Wiki; Accessed Nov. 30, 2016.
(Continued)

*Primary Examiner* — Jeff A Burke
*Assistant Examiner* — Cindy Nguyen
(74) *Attorney, Agent, or Firm* — Larry E. Henneman, Jr.; Henneman & Associates, PLC

(57) ABSTRACT

The invention prevents improper deletes of file system objects during rescan synchronizations of local and remote (cloud) file systems. File and folder deletes are validated (confirmed) during a rescan synchronization using events generated for a steady state synchronization process. Any improper deletes are fenced and not allowed to proceed during synchronization. A method for synchronizing local (LFS) and remote (RFS) file systems includes monitoring the LFS for changes, generating a first set of events as part of a first synchronization routine (e.g., a steady state synchronization routine), generating a second set of events as part of a second (rescan) synchronization routine, validating selected events of the second set with events of the first set to determine whether each of the selected events of the second set is valid or invalid, and synchronizing the file systems based on the events of the second set excluding those that have been invalidated. Storage systems are also disclosed.

30 Claims, 21 Drawing Sheets

(56) References Cited

U.S. PATENT DOCUMENTS

| | | | |
|---|---|---|---|
| 5,832,211 A | 11/1998 | Blakley, III et al. | |
| 6,088,706 A | 7/2000 | Hild | |
| 6,560,615 B1 | 5/2003 | Zayas et al. | |
| 6,847,984 B1 | 1/2005 | Midgley et al. | |
| 6,847,993 B1 | 1/2005 | Novaes et al. | |
| 6,925,476 B1 | 8/2005 | Multer et al. | |
| 6,952,737 B1 | 10/2005 | Coates et al. | |
| 7,085,779 B2 | 8/2006 | Holtz et al. | |
| 7,203,731 B1 | 4/2007 | Coates et al. | |
| 7,266,555 B1 | 9/2007 | Coates et al. | |
| 7,266,556 B1 | 9/2007 | Coates | |
| 7,281,168 B1 | 10/2007 | Coates et al. | |
| 7,428,540 B1 | 9/2008 | Coates et al. | |
| 7,636,743 B2 | 12/2009 | Erofeev | |
| 7,660,830 B2 | 2/2010 | Ordille | |
| 7,743,023 B2 | 6/2010 | Teodosiu et al. | |
| 8,655,850 B2 | 2/2014 | Ngo et al. | |
| 9,135,269 B2 | 9/2015 | Shetty et al. | |
| 9,189,533 B2 | 11/2015 | Wautier et al. | |
| 9,424,437 B1 | 8/2016 | Ancin et al. | |
| 9,483,491 B2 | 11/2016 | Wijayaratne et al. | |
| 2001/0047400 A1 | 11/2001 | Coates et al. | |
| 2002/0184242 A1 | 12/2002 | Holtz et al. | |
| 2003/0149696 A1 | 8/2003 | Nelson et al. | |
| 2003/0153302 A1 | 8/2003 | Lewis et al. | |
| 2004/0068523 A1 | 4/2004 | Keith, Jr. et al. | |
| 2006/0004765 A1 | 1/2006 | Anderson et al. | |
| 2006/0129627 A1 | 6/2006 | Phillips et al. | |
| 2006/0155776 A1* | 7/2006 | Aust | G06F 17/30067 |
| 2006/0247964 A1 | 11/2006 | Baturytski et al. | |
| 2006/0293034 A1 | 12/2006 | Armstrong | |
| 2007/0185932 A1 | 8/2007 | Teodosiu et al. | |
| 2009/0193107 A1* | 7/2009 | Srinivasan | G06F 17/30132 709/223 |
| 2010/0070870 A1 | 3/2010 | Halperin et al. | |
| 2010/0077026 A1 | 3/2010 | Watanabe et al. | |
| 2010/0144383 A1 | 6/2010 | Berger et al. | |
| 2010/0241668 A1 | 9/2010 | Susanto et al. | |
| 2010/0265823 A1 | 10/2010 | Zhao et al. | |
| 2011/0099233 A1 | 4/2011 | Calder et al. | |
| 2011/0110568 A1 | 5/2011 | Vesper et al. | |
| 2011/0153351 A1 | 6/2011 | Vesper et al. | |
| 2011/0218964 A1 | 9/2011 | Hagan et al. | |
| 2011/0252071 A1 | 10/2011 | Cidon | |
| 2011/0276573 A1 | 11/2011 | Wang et al. | |
| 2012/0011340 A1 | 1/2012 | Flynn et al. | |
| 2012/0070045 A1 | 3/2012 | Vesper et al. | |
| 2012/0124014 A1 | 5/2012 | Provenzano | |
| 2012/0179653 A1 | 7/2012 | Araki et al. | |
| 2012/0233119 A1 | 9/2012 | Barton et al. | |
| 2013/0060842 A1 | 3/2013 | Grossman | |
| 2013/0138608 A1 | 5/2013 | Smith | |
| 2013/0212067 A1 | 8/2013 | Piasecki et al. | |
| 2013/0275973 A1 | 10/2013 | Greenfield et al. | |
| 2013/0282657 A1 | 10/2013 | Besen et al. | |
| 2013/0282785 A1 | 10/2013 | Besen et al. | |
| 2013/0282790 A1 | 10/2013 | Catmull et al. | |
| 2014/0040196 A1 | 2/2014 | Wijayaratne et al. | |
| 2014/0040197 A1* | 2/2014 | Wijayaratne | G06F 16/11 707/625 |
| 2014/0059226 A1 | 2/2014 | Messerli et al. | |
| 2014/0149461 A1 | 5/2014 | Wijayaratne et al. | |
| 2014/0149794 A1 | 5/2014 | Shetty et al. | |
| 2014/0195485 A1* | 7/2014 | Dorman | G06F 17/30144 707/624 |
| 2014/0201139 A1* | 7/2014 | Blanding | G06F 17/30575 707/621 |
| 2014/0201145 A1* | 7/2014 | Dorman | G06F 16/27 707/634 |
| 2014/0358860 A1 | 12/2014 | Wautier et al. | |
| 2014/0372376 A1 | 12/2014 | Smith et al. | |
| 2014/0379647 A1 | 12/2014 | Smith et al. | |
| 2015/0058503 A1 | 2/2015 | Deguchi | |
| 2015/0186668 A1 | 7/2015 | Whaley et al. | |
| 2015/0249710 A1 | 9/2015 | Stefansson et al. | |
| 2015/0347189 A1 | 12/2015 | Steffen et al. | |
| 2015/0347453 A1 | 12/2015 | Shetty et al. | |
| 2015/0350326 A1 | 12/2015 | Shetty et al. | |
| 2015/0370827 A1 | 12/2015 | Parkison et al. | |
| 2016/0019233 A1 | 1/2016 | Wijayaratne et al. | |
| 2017/0041795 A1 | 2/2017 | Jassal et al. | |
| 2017/0124111 A1 | 5/2017 | Sharma et al. | |
| 2017/0177613 A1 | 6/2017 | Sharma et al. | |
| 2018/0046644 A1 | 2/2018 | Smith et al. | |
| 2018/0068112 A1 | 3/2018 | Sharma et al. | |

OTHER PUBLICATIONS

Active Directory by Microsoft Wiki Page; Accessed Dec. 2, 2016.
Keeping an Eye on Your NTFS Drives: The Windows 2000 Change Journal Explained; MSDN; Jeffrey Cooperstein et al.; Microsoft Systems Journal, Sep. 1999; Web; May 1, 2015; https://www.microsoft.com/msj/0999/journal/journal.aspx.>.
U.S. Appl. No. 13/958,298, Office Action dated Oct. 5, 2015.
U.S. Appl. No. 13/958,298, Office Action dated May 4, 2016.
U.S. Appl. No. 13/958,298, Office Action dated Dec. 13, 2016.
U.S. Appl. No. 13/958,298, Interview Summary dated May 17, 2017.
U.S. Appl. No. 13/958,298, Notice of Allowance dated Aug. 24, 2017.
U.S. Appl. No. 13/958,435, Office Action dated May 8, 2015.
U.S. Appl. No. 13/958,435, Office Action dated Nov. 17, 2015.
U.S. Appl. No. 13/958,435, Office Action dated May 5, 2016.
U.S. Appl. No. 13/958,435, Office Action dated Nov. 22, 2016.
U.S. Appl. No. 13/958,435, NOA dated Sep. 18, 2017.
U.S. Appl. No. 14/805,226, Office Action dated Aug. 29, 2017.
U.S. Appl. No. 14/805,226, Office Action dated Mar. 8, 2018.
PCT Application Serial No. PCT/US15/41412 International Search Report & Written Opinion dated Dec. 11, 2015.
PCT Application Serial No. PCT/US15/41412 International Preliminary Report on Patentability dated Feb. 2, 2017.
U.S. Appl. No. 15/388,038, Office Action, dated Jul. 18, 2019.

* cited by examiner

| RFS Snapshot 206 | LVS Database 209 | LFS Snapshot 208 | RS Event | File System Operation |
|---|---|---|---|---|
| | | /Shared/A/ | Folder Created in LFS | Create Folder in RFS |
| /Shared/B/c.txt | | | File Created in RFS | Create File in LFS |

| RFS Snapshot 206 | LVS Database 209 | LFS Snapshot 208 | RS Event | File System Operation |
|---|---|---|---|---|
| | /Shared/A/ | /Shared/A/ | No Action | No Action |
| /Shared/B/c.txt | /Shared/B/c.txt | | No Action | No Action |

| RFS Snapshot 206 | LVS Database 209 | LFS Snapshot 208 | RS Event | File System Operation |
|---|---|---|---|---|
| /Shared/A/ | | | Folder Deleted from LFS | Delete Folder from RFS |
| | /Shared/B/c.txt | | File Deleted from RFS | Delete File from LFS |
| /Shared/M/c.txt | | | File Created in RFS | Create File in LFS |

| RFS Snapshot 206 | LVS Database 209 | LFS Snapshot 208 | RS Event | File System Operation |
|---|---|---|---|---|
| | /Shared/D/e.txt | | No Action | No Action |
| /Shared/X/ | /Shared/X/ | | No Action | No Action |

FIG. 3D ⤴ 308

| RFS Snapshot 206 | LVS Database 209 | LFS Snapshot 208 | RS Event | File System Operation |
|---|---|---|---|---|
| | /Shared/D/e.txt | /Shared/D/e.txt | File Deleted from RFS | Delete File from LFS |
| /Shared/X/ | /Shared/X/ | | Folder Deleted from LFS | Delete Folder from RFS |

FIG. 3E ⤴ 310

| RFS Snapshot 206 | LVS Database 209 | LFS Snapshot 208 | RS Event | File System Operation |
|---|---|---|---|---|
| | /Shared/M/ | /Shared/M/ | Folder Deleted in RFS | Delete Folder from LFS |
| | /Shared/N/ | /Shared/N/ | Folder Deleted in RFS | Delete Folder from LFS |
| /Shared/N/z.txt | /Shared/N/z.txt | | File Deleted in RFS | Delete File from LFS |

FIG. 12B ⤴ 1250

SYSTEM AND METHOD FOR DELETE FENCING DURING SYNCHRONIZATION OF REMOTE AND LOCAL FILE SYSTEMS

CROSS-REFERENCE TO RELATED APPLICATIONS

This application claims the benefit of U.S. Provisional Patent Application Ser. No. 62/145,637, filed on Apr. 10, 2015 by at least one common inventor, which is incorporated herein by reference in its entirety.

BACKGROUND OF THE INVENTION

Field of the Invention

This invention relates generally to computer systems, and more particularly to cloud file storage systems. Even more particularly, this invention relates to reducing errors and data loss during synchronization of local and remote file systems.

Description of the Background Art

Cloud computing systems are known. In cloud computing systems, computing and storage services are provided to remote clients over a wide area network such as the Internet. In the case of storage, a client's local files can be stored on the cloud and accessed by the client remotely.

Often a client's file system will exist both in the client's local file storage system (e.g., a hard drive, network attached storage (NAS) device, etc.) and in the cloud. For example, a client might store a backup copy of its local file system in the cloud. Doing so is beneficial from the standpoints that the client has data security in the backup copy. However, the benefits of the backup are negated as more and more changes are made to the local file system. For example, it is common for the remote file system on the cloud to be significantly older than the local file system, putting the local file system at risk if it is damaged. Similarly, if changes are made to the remote file system, then the remote file system becomes different from the local file system and the user might get confused as to which file system is the most recent for a given object. Thus, it becomes a burden on the client to make sure the local and remote file systems are synchronized.

Methods for synchronizing the local and remote file systems exist. While these synchronization processes ease the burden on clients of keeping their local and remote file systems up to date, such synchronization processes can also cause problems. For example, if the synchronization process crashes, data can be lost. Additionally, synchronization processes can have race or error conditions that, unbeknownst to the user or software provider, corrupt the synchronization process. Accordingly, even though the synchronization would appear to have been successful, such hidden problems still cause data loss and are very difficult to identify and correct.

What is needed, therefore, is a system and method that facilitates reliable synchronization of a client's local and remote file systems. What is also needed is a system and method that prevents unintended data loss as a result of the synchronization process.

SUMMARY

The present invention overcomes the problems associated with the prior art by providing a system and method for preventing improper deletes of file system objects during synchronization of local and remote (cloud) file systems. The invention facilitates validating (confirming) file and folder deletes during a rescan synchronization using events generated for a steady state synchronization process. Any rescan delete on one file system that is determined to be invalid is fenced and not synchronized with the opposite file system.

A method for synchronizing a local file system (LFS) and a remote file system (RFS) in a local file storage system includes the steps of monitoring the LFS for changes made to the LFS and generating a first set of events as part of a first synchronization routine (e.g., a steady state synchronization routine), where at least some of the events of the first set are generated in response to one of the changes being made to the LFS. The method also includes the steps of generating a second set of events as part of a second synchronization routine for synchronizing portions of the LFS and RFS, validating selected ones of the events of the second set with at least some of the events of the first set to determine whether each of the selected events of the second set is valid or invalid, and synchronizing portions of the LFS and RFS based on events of the second set, excluding those events of the second set that were determined to be invalid. In a particular method, the second synchronization routine comprises a snapshot-based synchronization process operative to compare at least a portion of the LFS with a corresponding portion of the RFS for changes between the LFS and the RFS such that each of the events of the second set is associated with one of the changes. The invalidated events can be excluded (fenced) in various ways including, but not limited to, deleting ones of the selected events of the second set that are determined to be invalid, ignoring ones of the events of the second set that are determined to be invalid, and/or (during the synchronization step) generating file system operations based on the events of the second set and discarding file system operations generated based on invalidated events of the second set.

According to a particular method, the selected events of the second set include ones of the events of the second set that are associated with deleting a file system object. In a more particular method, the step of validating the selected events of the second set includes invalidating each of the selected events of the second set that would result in a file system object being mistakenly deleted during synchronization. For example, the validating step can include the steps of determining that a first event of the second set is indicative of a first file system object having been deleted from the LFS such that synchronization based on that event would result in a corresponding first file system object being deleted from the RFS, and determining if at least one of the events of the first set confirms that the first file system object was deleted from the LFS. Even The first event of the second set is invalidated if none of the events of the first set indicates that the first file system object was deleted from the LFS.

Another exemplary method includes the steps of establishing a connection with a remote file storage system having access to the RFS, receiving additional events of the first set from the remote file storage system, where each of the additional events of the first set were generated responsive to a change made to the RFS, and validating at least some of the selected events of the second set with at least some of the additional events of the first set received from the remote file storage system. Here, the step of validating selected events of the second set includes determining that a first event of the second set is indicative of a first file system object having been deleted from the RFS such that synchronization based on the first event of the second set would result in a corresponding first file system object being deleted from the LFS, and determining if at least one of the additional events of the first set confirms that the first file system object was deleted from the RFS.

A particular method can include the step of building at least one validation list based on at least some of the events of the first set. A more particular method includes the steps of establishing a connection with a remote file storage system having access to the RFS and receiving additional events of the first set from the remote file storage system, where each of the additional events of the first set were generated responsive to a change made to the RFS. Furthermore, the step of validating selected ones of the events of the second set includes building a first plurality of validation lists based on the events of the first set that are generated as changes are made to the LFS and building a second plurality of validation lists based on the additional events of the first set that are generated as changes are made to the RFS. Building either plurality of validation lists can include building a first validation list based on file events of the first set and building a second validation list based on folder events of the first set. The first validation list can be populated based on events of the first set that are associated with file deletes and file renames, and the second validation list can be populated based on events of the first set that are associated with folder deletes and folder renames.

A local file storage system according to the invention includes memory for storing the LFS and code, at least one processing unit for executing the code, a client interface operative to enable one or more local users to access the LFS, a remote cloud interface operative to communicate with an RFS, and an LFS module operative to monitor for changes being made to the LFS and to output local event information about each of the changes. The local file storage system further includes a data monitor operative to generate a first set of events responsive to the local event information, where at least some of the events of the first set are generated as part of a first synchronization routine (e.g., a steady state synchronization routine), a rescan synchronizer operative to generate a second set of events as part of a second synchronization routine (e.g., a snapshot-based synchronization routine), and an event processor. The event processor is operative to validate selected ones of the events of the second set with at least some of the events of the first set to determine whether each of the selected events of the second set is valid or invalid and to generate file system operations to synchronize portions of the LFS and the RFS based on the events of the second set, excluding events of the second set determined to be invalid. The event processor is further operative to fence invalidated ones of the selected events of the second set. For example, the event processor can delete the invalidated selected events of the second set, ignore the invalidated selected events of the second set, or discard file system operations generated based on invalidated ones of the selected events of the second set, etc.

The selected events of the second set include ones of the events of the second set that are associated with deleted file system objects on the LFS and/or the RFS, and the event processor is operative to invalidate each of the selected events of the second set that would result in a file system object being mistakenly deleted during synchronization. For example, the event processor can determine that a first event of the second set is indicative of a first file system object having been deleted from the LFS such that synchronization based on the first event of the second set would result in a corresponding first file system object being deleted from the RFS and determine if at least one of the events of the first set confirms that the first file system object was deleted from the LFS. Additionally, the event processor can invalidate the first event of the second set if none of the events of the first set indicates that the first file system object was deleted from the LFS.

In another embodiment, the remote cloud interface is operative to receive additional events of the first set from the remote file storage system, where each of the additional events of the first set were generated responsive to a change made to the RFS, and the event processor is operative to validate at least some of the selected events of the second set using the additional events of the first set received from the remote file storage system. The event processor is further operative to determine that a first event of the second set is indicative of a first file system object having been deleted from the RFS such that synchronization based on the first event of the second set would result in a corresponding first file system object being deleted from the LFS and to determine if at least one of the additional events of the first set confirms that the first file system object was deleted from the RFS.

The local file storage system can also include at least one validation list generator operative to build at least one validation list based on at least some of the events of the first set. For example, the remote cloud interface can be operative to receive additional events of the first set from the remote file storage system, where each of the additional events of the first set having been generated responsive to a change made to the RFS, and the validation list generator can build a first plurality of validation lists based on the events of the first set that were generated responsive to changes made to the LFS and build a second plurality of validation lists based on the additional events of the first set that were generated responsive to changes made to the RFS. For either plurality of lists, the validation list generator can build a first validation list based on file events of the first set and build a second validation list based on folder events of the first set. The first validation list can be populated based on events of the first set that are associated with file deletes and file renames, and the second validation list can be populated based on events of the first set that are associated with folder deletes and folder renames.

Thus, the present invention provides a means for fencing events of the second set that would result in file system objects of at least one of the LFS and the RFS being mistakenly deleted during synchronization, as well as a means for synchronizing portions of the LFS and the RFS based on the events of the second set, excluding the invalidated events. The invention also encompasses non-transitory, electronically-readable storage media having code embodied thereon for causing electronic device(s) to perform any of the methods described here.

BRIEF DESCRIPTION OF THE DRAWINGS

The present invention is described with reference to the following drawings, wherein like reference numbers denote substantially similar elements:

FIG. 3A is a table associated with a first snapshot-based synchronization process;

FIG. 3B is a table associated with another snapshot-based synchronization process;

FIG. 3C is a table associated with still another snapshot-based synchronization process;

FIG. 3D is a table associated with yet another snapshot-based synchronization process;

FIG. 3E is a table associated with still another snapshot-based synchronization process;

FIG. 12B is a table illustrating an advantage of the present invention;

DETAILED DESCRIPTION

The present invention overcomes the problems associated with the prior art by providing a system and method for preventing improper deletes of file system objects during synchronization of local and remote (cloud) file systems. In the following description, numerous specific details are set forth (e.g., particular data structures, building particular lists, etc.) in order to provide a thorough understanding of the invention. Those skilled in the art will recognize, however, that the invention may be practiced apart from these specific details. In other instances, details of well-known computing practices and components and components have been omitted, so as not to unnecessarily obscure the present invention.

Figure 1:
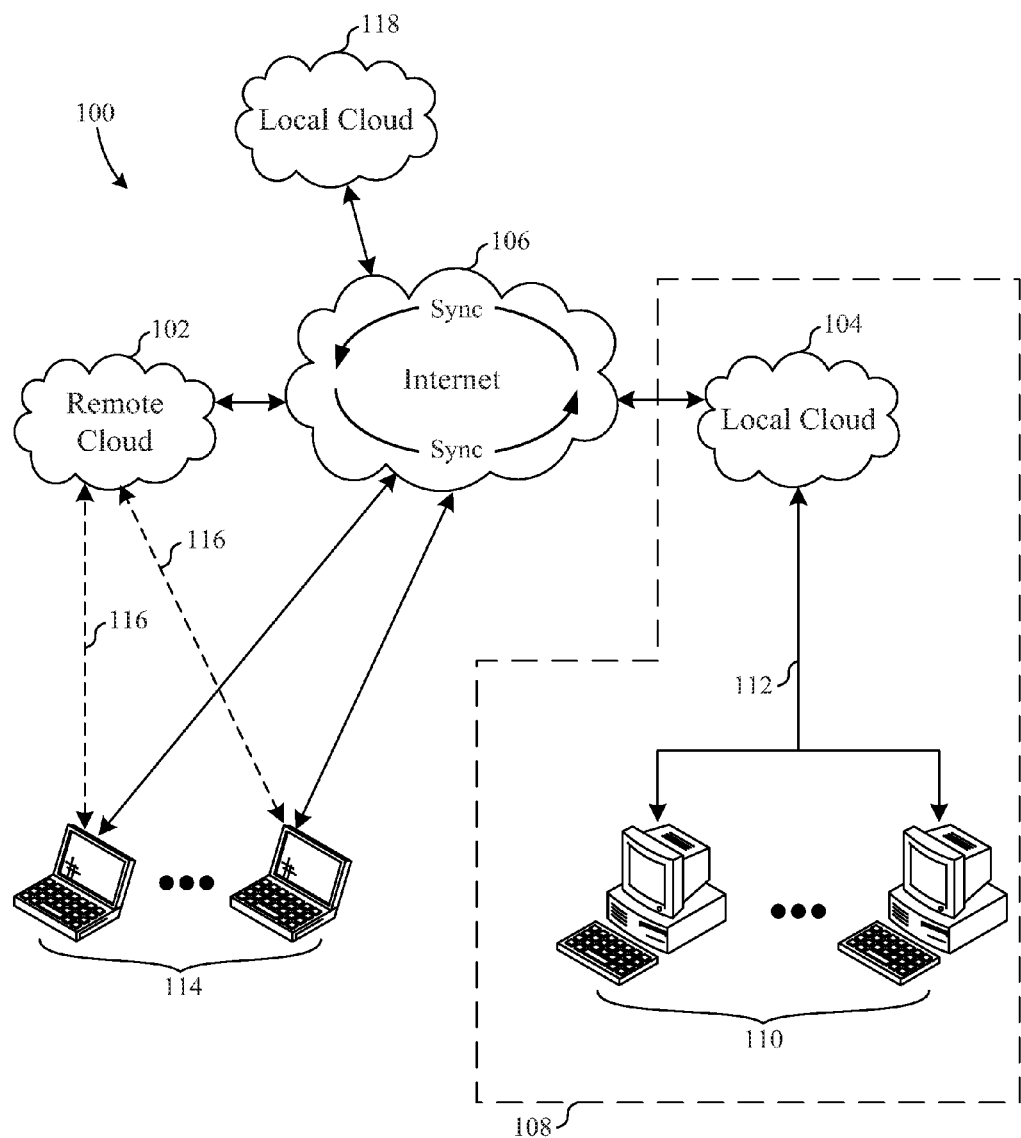
FIG. 1 is a diagram of a cloud computing system.

FIG. 1 shows a cloud computing system 100 to include a remote cloud server 102 and a local cloud server 104, which communicate and are synchronized via the Internet 106. Local cloud 104 can be hosted, for example, by a file server in an office 108 of a client and is, therefore, sometimes referred to as an office local cloud (OLC). Local users 110 of the client can access local file system objects (e.g., files and folders) by directly accessing those local files system objects stored on local cloud server 104 via a local network 112. Local cloud server 104 can also extend local user access to file system objects stored on remote cloud server 102, and optionally objects on another local cloud server 118 associated with the client, via internet 106. Remote users 114 of the client can access remote file system objects stored on remote cloud server 102 via Internet 106 or via some other connection 116 with remote cloud server 102. In this embodiment, at least a portion of the local file system stored on local cloud server 104 is bi-directionally synchronized with the remote cloud server 102 to provide local and remote data access and remote data security. Although one-way synchronization of the local and remote file systems is also possible.

Where a client has multiple offices, as indicated by local cloud server 118, the local file systems of both local cloud server 104 and local cloud server 118 can be synchronized with remote cloud server 102. It should be understood that remote cloud server 102 can store and synchronize file systems associated with other clients as well, for example, on a subscription basis. The synchronization processes of the present invention will hereinafter be described with reference to local cloud server 104 and remote cloud server 102, but could be equally applied between local cloud server 118 and remote cloud server 102.

Figure 2A:
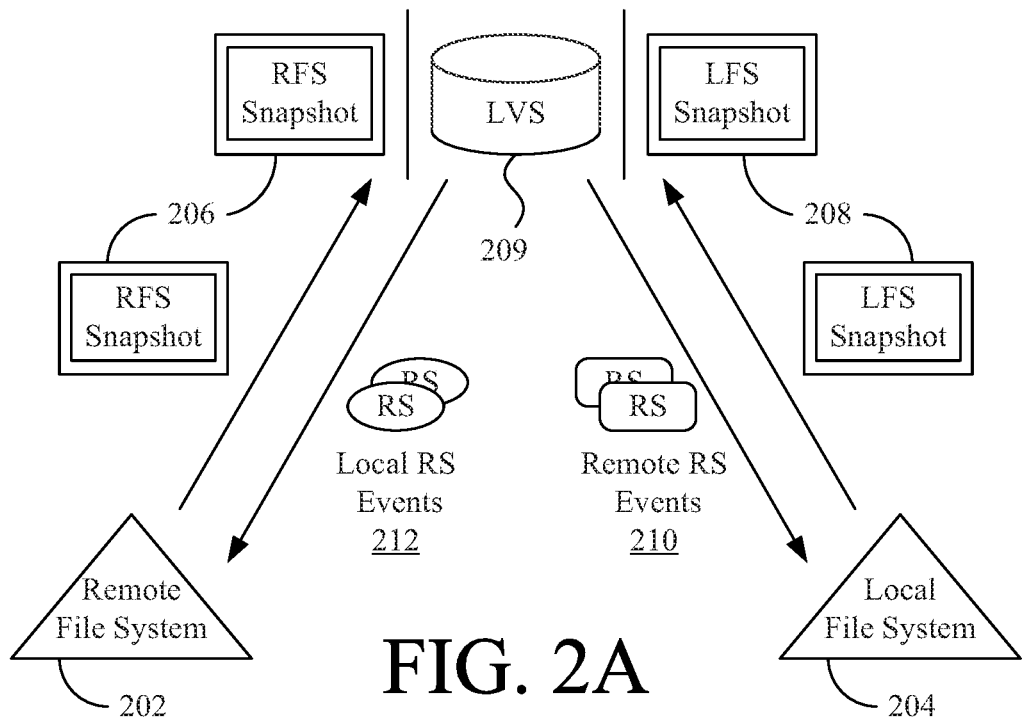
FIG. 2A illustrates a snapshot-based method of synchronizing local and remote file systems.
Figure 2B:
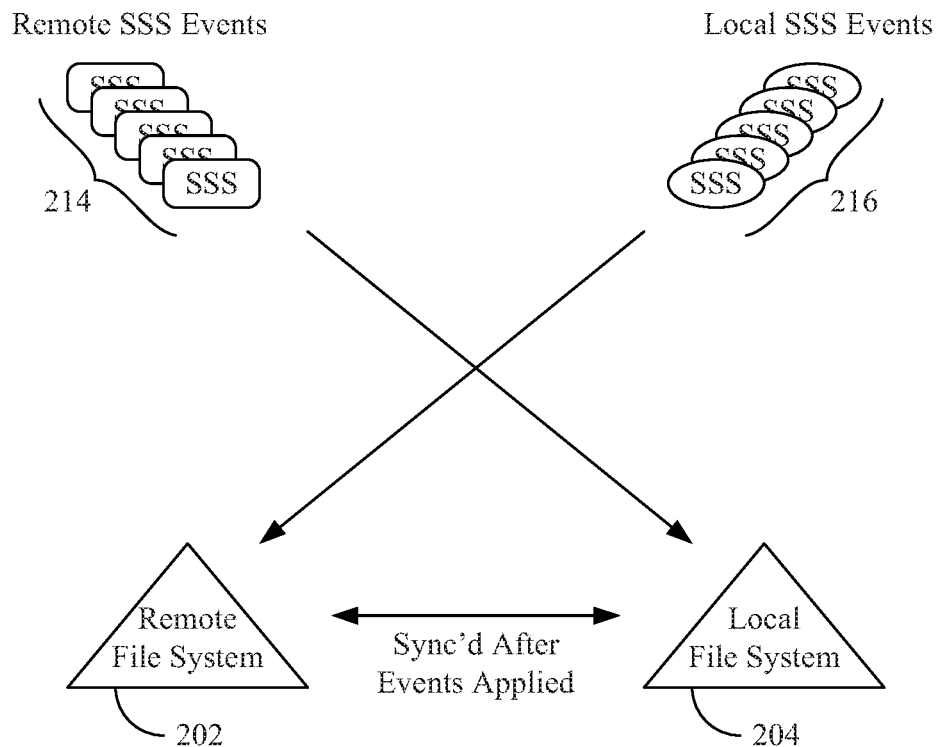
FIG. 2B illustrates a steady-state method of synchronizing local and remote file systems.

With reference to FIGS. 2A-2B, synchronization is the process of making a remote file system (RFS) 202 stored on remote cloud server 102 and a local file system (LFS) 204 stored on local cloud server 104 the same or nearly the same. RFS 202 and LFS 204 are each defined by metadata (defining the file system's namespace and object attributes) and data (e.g., associated file data). Thus, after synchronization, the metadata and file data of RFS 202 and LFS 204 will be synchronized. Different types of synchronization routines are used with the present invention and include, but are not limited to, snapshot-based synchronizations and steady-state synchronizations.

FIG. 2A illustrates a snapshot-based method of synchronizing all or specific portions of RFS 202 and LFS 204 according to the invention. According to snapshot-based synchronization, metadata snapshots 206 and 208 of the RFS 202 and LFS 204, respectively, are obtained at some time $T_s$. The attributes in snapshots 206 and 208, and optionally in a last valid sync (LVS) database 209 (described below), are compared and the differences are used to generate remote RS events 210 and local RS events 212. The remote and local RS events 210 and 212 are then used to apply corresponding changes to LFS 204 and RFS 202, respectively, to bring RFS 202 and LFS into synchronization. Remote RS events 210 represent changes to RFS 202 (or differences between RFS 202 and LFS 204) that need to be applied to LFS 204 to synchronize its metadata and/or data with RFS 202. Conversely, local RS events 212 represent changes to LFS 204 (or differences between LFS 204 and RFS 202) that need to be applied to RFS 202 to synchronize its metadata and/or data with LFS 204. The remote and local RS events 210 and 212 are then applied to the opposite file systems using file system operations that will synchronize RFS 202 and LFS 204 as of time $T_s$.

There are several types of snapshot-based synchronizations, including a Full File System (FFS) synchronization, a Full Rescan Synchronization (FRS), and a Limited Rescan Synchronization (LRS). FFS synchronization is used when a client synchronizes its local cloud server 104 with remote cloud server 102 for the first time (e.g., when an account is opened, etc.), such that LFS 204 is initially copied to remote cloud server 102 and stored in RFS 202. Sometimes FFS synchronization is used together with data seeding of remote cloud server 102 to reduce the time it takes to perform the initial synchronization. FFS synchronization compares the RFS and LFS snapshots 206 and 208 in order to generate the appropriate RS events 210 and 212 and associated file system operations. As part of the FFS synchronization, LVS database 209 is populated. In particular, LVS database 209 stores extended attributes about every file system object (e.g., files and folders) that has been successfully synchronized between RFS 202 and LFS 204.

After the initial FFS synchronization, FRS and LRS can be used to resynchronize all or parts of RFS 202 and LFS 204. Because FRS and LRS operate similarly, they might be referred to herein as simply a rescan synchronization (RS).

An FRS is used to re-synchronize the entire synchronized portions of LFS 204 and RFS 202. An FRS is the same as FFS except that the extended attributes in LVS database 209 is also compared with the RFS and LFS snapshots 206 and 208 when generating the RS events 210 and 212. This speeds up synchronization by preventing files and folders that are already in sync from being synchronized again. When an FRS is triggered, new metadata snapshots 206 and 208 of RFS 202 and LFS 204 are captured and compared along with data in LVS database 209. New local and remote RS events 210 and 212 are generated based on this comparison and associated file system operations are applied to bring the RFS 202 and LFS 204 back into synchronization.

An LRS is similar to an FRS but only takes place on limited portions (e.g., only for specific file and folder paths) of the synchronized namespace. Accordingly, partial metadata snapshots 206 and 208 associated with the limited portions of the RFS 202 and LFS 202 are used. Like with FRS, LVS database 209 improves the efficiency of the LRS also. Like FFS, entries in LVS database 209 are created, updated, or removed as file system objects are synchronized.

The snapshot-based synchronization processes described above are very CPU and memory intensive for file systems with large namespaces. Accordingly, snapshot-based synchronizations can take a very long time to complete (e.g., several days), particularly in the case of an FFS and FRS. Moreover, as will be described below, if the LVS database 209 includes incorrect entries, then data can be lost during rescan synchronizations.

FIG. 2B illustrates a steady-state synchronization (SSS) routine, which is also employed by the present invention. SSS is based on monitoring and collecting all of the changes (events) made to LFS 204 (e.g., by local users 110) and all of the changes made to RFS 202 (e.g., by remote users 116) as they occur, for example, between some point in time, $T_1$, and a later time, $T_2$. SSS events associated with changes made to RFS 202 and LFS 204 are termed "remote" SSS events 214 and "local" SSS events 216, respectively. The remote SSS events 214 and local SSS events 216 are then processed such that appropriate file system operations are generated and applied to LFS 204 and RFS 202 to synchronize RFS 202 and LFS 204 as of time $T_2$. The time period between $T_1$ and $T_2$ is called an event synchronization period. LVS database 209 is updated as SSS events are processed and synchronizations of file system objects complete, so that LVS database 209 is up-to-date for use during rescan synchronizations.

The steady-state synchronization (SSS) process of FIG. 2B enables RFS 202 and LFS 204 to remain synchronized as RFS 202 and LFS 204 are synchronized for consecutive event synchronization periods. The steady-state synchronization process is also easily scalable and uses resources more efficiently than relying solely on the snapshot-based synchronization methods of FIG. 2A.

SSS synchronization can be employed to keep RFS 202 and LFS 204 in synchronization in near real time. Accordingly, SSS processes will be actively recording SSS events on remote cloud server 102 and local cloud server 104 for a given event synchronization period.

Sometimes, however, an RS (either an FRS or LRS) is needed to resynchronize the file systems in between consecutive SSS event synchronization periods or can be triggered by SSS process itself. For example, the SSS process might trigger an FRS if the SSS process crashes, if there are too many SSS events to process for an event synchronization period, if the SSS process determines that events were lost, if a conflict needs to be resolved between multiple SSS events, or if too much time has elapsed since the last SSS completed (e.g., the current event synchronization period becomes too long). Similarly, the SSS process might trigger an LRS in response to certain SSS events (e.g., merging folders, restoring from trash, copying folders, etc.) or to resolve certain conflicts between multiple SSS events. Accordingly, rescan synchronizations will be triggered even though there are still unprocessed SSS events 214 and 216 pending synchronization.

U.S. Publication No. 2014/0040196 A1, dated Feb. 6, 2014 by Wijayaratne et al. and entitled "System and Method for Event-Based Synchronization of Remote and Local File Systems", and U.S. Publication No. 2014/0040197 A1, dated Feb. 6, 2014 by Wijayaratne et al. and entitled "System and Method for Event-Based Synchronization of Remote and Local File Systems" further explain snapshot and steady-state synchronizations of remote and local file systems and are incorporated herein by reference in their respective entireties. These publications also describe SSS event conflicts that can trigger rescan synchronizations.

As mentioned above, an "event" represents a change to a file system. Stated another way, an event represents a difference between RFS 202 and LFS 204. Changes made to RFS 202 are remote events, whereas changes made to the LFS 204 are local events. Additionally, FIGS. 2A-2B indicate that events can be created based on different synchronization routines. For example, SSS events can be considered to comprise a first set of events generated as part of a first synchronization routine, and RS events can be considered to comprise a second set of events generated as part of a second synchronization routine.

SSS events include file events and folder events. File SSS events include, but are not limited to, creating a file (CREATE), updating a file (UPDATE), deleting a file (UNLINK), and renaming a file (RENAME). Because RENAME operates on the path of the file, RENAME can be used for both rename file events and move file events. Additionally, RENAME events are represented from both the source and destination path perspectives to facilitate event processing from both perspectives. A RENAME file event from the source perspective is referred to as RENAME_SRC_FILE (RSF) and a RENAME file event from the destination perspective is referred to as RENAME_DST_FILE (RDF). Folder SSS events include, but are not limited to, creating a folder (MKDIR), removing a folder (RMDIR), and renaming (RENAME) a folder. Folder rename events are also represented from both the source perspective (RENAME_SRC_DIR, "RSD") and from the destination perspective (RENAME_DST_DIR, "RDD") and are used to record both folder renames and folder moves. Other events can be used, including restoring from trash or prior version, merging folders or files, etc.

In this embodiment, the types of RS events are similar to the types of SSS events and include file and folder events. File RS events include, but are not limited to, CREATE, UPDATE, and UNLINK. Folder RS events include, but are not limited to, MKDIR and RMDIR. In a particular embodiment, RS events do not include RENAME events, because RS events are generated by comparing file system snapshots and LVS database 209. For example, if a previously synchronized file was renamed in LFS 202, a subsequent rescan synchronization would cause the file with the new name to be created in (pushed to) RFS 204 and the file with the old name to be deleted from RFS 204. The same would occur if a folder was renamed.

FIGS. 3A-3E are tables describing exemplary snapshot-based synchronization processes employed by the present invention. The tables in FIGS. 3A-3E are limited in number of examples for simplicity. As will be understood, however, each snapshot-based synchronization process will likely involve a great many file system object comparisons and result in large numbers of RS events and associated file system operations being generated.

FIG. 3A shows a table 302 associated with a first snapshot-based synchronization process at some time $T_A$. This first synchronization process will be assumed to be a rescan synchronization (an FRS or LRS) but could also be an FFS due to the lack of entries in LVS database 209. The rescan synchronization (RS) is carried out by comparing objects present in RFS snapshot 206, LVS database 209, and LFS snapshot 208, for example on a path-by-path basis. Based on this comparison, RS events are generated to record the changes between file systems such that file system operations can be generated and applied to synchronize the associated portions of LFS 202 and RFS 204. Upon valid synchronization, LVS database 209 is updated to reflect each synchronized file system object, for example, by recording the object's path and other desirable extended attributes in LVS database 209.

Here, LFS snapshot 208 includes a folder entry "/Shared/A/" that is not present in RFS snapshot 206 or in LVS database 209. Accordingly, a local RS event 212 is generated indicating that "/Shared/A/" has been created in LFS 204. This local RS event 212 will then be used to generate file system operations to cause a corresponding folder to be created in RFS 202 as the rescan synchronization is carried out. Upon successful synchronization, LVS database 209 will be updated to reflect the synchronized folder "/Shared/A/".

Table 302 also shows that RFS snapshot 206 includes a file entry "/Shared/B/c.txt" which is not present in LFS snapshot 208 or in LVS database 209. Accordingly, a remote RS event 210 is generated indicating that "/Shared/B/c.txt" was created in RFS 202. This remote RS event 210 is used to generate file system operations to cause a corresponding file to be created in LFS 202. Upon successful synchronization, LVS database 209 is updated to reflect the synchronized file "/Shared/B/c.txt".

FIG. 3B shows a table 304 associated with an RS that occurs at some $T_B$, after time $T_A$. The comparison of RFS snapshot 206, the data in LVS Database 209, and LFS snapshot 208 indicates that no changes have occurred to the synchronized objects "/Shared/A/" and "/Shared/B/c.txt" since the first synchronization was completed. Accordingly, no synchronization is needed and no RS events are generated based on these file system objects. FIG. 3B indicates how the entries in LVS database 209 save time and resources by preventing the resynchronization of file system objects that have not changed since the prior synchronization.

FIG. 3C shows a table 306 associated with an RS that occurs at time $T_C$ after time $T_B$. At time $T_C$, LFS snapshot 208 no longer includes an entry for the folder "/Shared/A/", but "/Shared/A/" is still present in RFS snapshot 206 and LVS database 209. This means that "/Shared/A" was previously synchronized in RFS 202 and LFS 204 but was deleted from LFS 204 between times $T_B$ and $T_C$. As a result, a local RS event 212 is generated to record that "/Shared/A/" was deleted from LFS 204. This local RS event 212 is then used to generate file system operations that cause the folder "/Shared/A/" to be deleted from RFS 202. Upon successful synchronization, LVS database 209 is updated to remove the path "/Shared/A/" (and any associated extended attributes data) therefrom.

Similarly, RFS snapshot 206 no longer includes an entry for the file "/Shared/B/c.txt". However, because this path still exists in LFS snapshot 208 and LVS database 209 means that the file had been previously synchronized in RFS 202 and LFS 204 but was deleted from RFS 202 between times $T_B$ and $T_C$. As a result, a remote RS event 210 is generated indicating that "/Shared/B/c.txt" was deleted from RFS 202. This remote RS event 210 is then used to generate file system operations that cause the file "/Shared/B/c.txt" to be deleted from LFS 204. If the file deletion is successful, then LVS database 209 will be updated to remove path "/Shared/B/c.txt" (and any associated extended attributes).

RFS snapshot 206 also includes an entry for "/Shared/M/c.txt". This entry might exist if the file "/Shared/B/c.txt" was moved from folder "Shared/B/" to folder "/Shared/M/". Accordingly, because the path "/Shared/M/c.txt" does not exist in LFS snapshot 208 or LVS database 209, a remote RS event 210 is generated indicating that the file "/Shared/M/c.txt" has been created in RFS 202. This remote RS event 210 is then used to generate file system operations that cause the file "/Shared/M/c.txt" to be created in LFS 204. If the file creation is successful, then LVS database 209 is updated with the path (and extended attributes) of the synchronized file "/Shared/M/c.txt". The rows of table 306 associated with "/Shared/B/c.txt" and "/Shared/M/c.txt" indicate how a file move (or rename) action within RFS 202 (or LFS 204) will be translated into a CREATE file RS event and a DELETE file RS event during a rescan synchronization process. The same can occur for a folder move.

The above examples illustrate how the data contained in LVS database 209 is important to the efficacy of rescan synchronizations, because the FRS and LRS processes rely on entries in LVS database 209 in order to generate correct file system operations. As will be explained in further detail below, if there are incorrect or leftover entries in the LVS database 209, then incorrect delete operations can be generated. These incorrect delete operations are destructive and can lead to temporary or permanent data loss in RFS 202 or LFS 204. The present invention, however, solves this problem by providing means for validating RS events that could be destructive using pending SSS events. Any invalidated RS events and/or associated file system operations are fenced (e.g., deleted, ignored, trapped, etc.) so that they are excluded from the synchronization process and data loss is prevented.

FIG. 3D shows a table 308 associated with an FRS or LRS that occurs at some point in time, $T_D$. Table 308 shows that LVS database 209 contains some potentially-spurious entries for "/Shared/D/e.txt" and "/Shared/X/". "/Shared/D/e.txt" and "/Shared/X/" represent file and folder objects, respectively, that may have been synchronized on RFS 202 and LFS 204 in the past, but are no longer present in either of RFS 202 and LFS 204 as indicated by their respective snapshots 206 and 208. Nevertheless, entries for these file system objects still exist in LVS database 209. If these entries in LVS database 209 are incorrect, they can lead to incorrect delete operations being generated during a rescan synchronization and can cause permanent data loss.

There are known and unknown causes for incorrect entries in LVS database 209. One possible cause of an invalid (leftover) entry is when an SSS process crashes or is interrupted after file system operations are applied to a file system(s) (e.g., to delete, rename, or move an object in response to an SSS event) but before LVS database 209 is updated. For example, if the system is performing an SSS based on a delete or rename, the sequence of actions is (1) perform the synchronization operation(s) and (2) update the appropriate entry or entries in LVS database 209. Unfortunately, if the synchronization process is interrupted after the operation is performed, but before the appropriate entries in LVS database 209 have been updated, leftover entries can remain in LVS database 209. Still other sources of incorrect entries in LVS database 209 include race and/or error conditions, which prevent the appropriate entries in LVS database 209 from being removed. Such race and error conditions are notoriously difficult to reproduce, identify, and debug. Accordingly, the present invention advantageously provides a safety net against incorrect deletes during an RS.

FIG. 3E shows a table 310 associated with an FRS or LRS that occurs at some point in time, $T_E$, after $T_D$. Table 310 shows that between times $T_D$ and $T_E$, the file "/Shared/D/e.txt" was created in LFS 204 and is, therefore, present in LFS snapshot 208. Similarly, the folder "/Shared/X/" was created in RFS 202 between times $T_D$ and $T_E$ and is, therefore, present in RFS snapshot 206. Thus, the desired synchronization actions would be to create "Shared/D/e.txt" in RFS 202 and to create "/Shared/X/" in LFS 204, respectively. However, the spurious entries in LVS database 209 do not let this occur.

Instead, destructive RS events are generated. In particular, as a result of the comparison between RFS snapshot 206, LFS snapshot 208, and LVS database 209, the RS routine generates a remote RS event 210 that indicates "/Shared/D/e.txt" was deleted from RFS 202. This remote RS event 210 then causes file system operations to be generated and applied to delete "/Shared/D/e.txt" from LFS 204. As is readily apparent, this is an undesirable destructive result because the file was just created in LFS 204.

A similarly-destructive result happens for the recently-created folder "/Shared/X/". Based on the comparison of RFS snapshot 206, LFS snapshot 208, and LVS database 209, the RS routine will generate a local RS event 212 that indicates "/Shared/X/" was deleted from LFS 204. This local RS event 212 then causes file system operations to be generated and applied to delete "/Shared/X/" from RFS 204, which results in another destructive outcome. This improper folder deletion is potentially very destructive, because the folder might include many child directories and/or objects (not shown in table 310).

In summary, FIG. 3E illustrates that improper leftover entries in LVS database 209 become destructive when a user creates a new file system object with the same name (path) as the leftover entry at some later time in either RFS 202 or LFS 204. FRS and LRS rely on the accuracy of the information contained in the LVS database 209 to generate correct file system operations. If there are unneeded entries in LVS database 209, then the FRS or LRS process will generate incorrect delete operations, resulting in temporary or permanent data loss.

Figure 4:
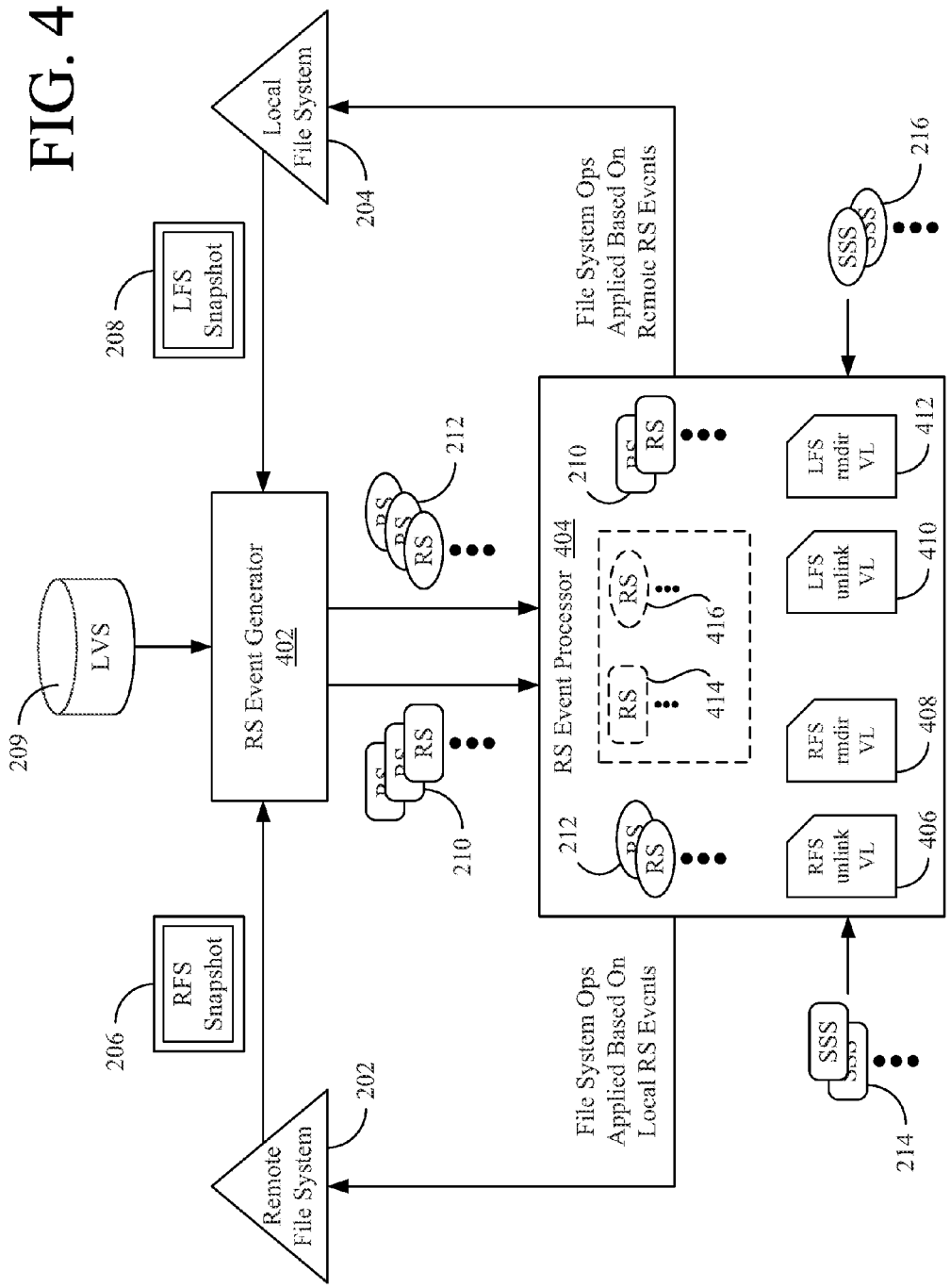
FIG. 4 is a relational diagram illustrating a process for delete fencing according to the present invention.

FIG. 4 is a relational diagram illustrating a rescan synchronization (RS) process according to the present invention which fences (e.g., deletes, ignores, traps, etc.) incorrect deletes. Steady state synchronizations and rescan synchronizations generally progress sequentially. Often, changes to one file system can be applied to the other using SSS events over consecutive event synchronization periods. However, in other circumstances (e.g., a conflict occurring during a steady state sync, etc.) a rescan synchronization is required. In such a case, it is desirable to validate the RS events generated by the rescan synchronization that will result in a file system object being deleted during synchronization against the available/pending SSS events. Invalidated RS events (and/or the associated file system operations) are then fenced and excluded from use during the rescan synchronization. Accordingly, the invention prevents data loss in RFS 202 and LFS 204.

Briefly, delete fencing can be implemented according to the following steps. First, delete validation lists are built from the available SSS events for RFS 202 and LFS 204. Second, the rescan synchronization process generates RS events based on the comparison of RFS snapshot 206, LFS snapshot 208, and LVS database 209. Next, ones of the RS events that could result in an incorrect file system object being deleted in one of the file systems are validated against the delete validation lists built from the SSS events. Then, the RS events, excluding the invalidated RS events, are applied to the file systems using file system operations to synchronize them.

FIG. 4 includes an RS event generator 402 and an RS event processor 404. RS event generator 402 carries out snapshot-based synchronizations, including FFS, FRS, and LRS, according to the invention. When an FRS or LRS is initiated, RS event generator 402 receives an RFS snapshot 206 of RFS 202 and a LFS snapshot 208 of LFS 204 as of some time. RS event generator 402 utilizes these snapshots and the data in LVS database 209 to make path-by-path comparisons of file system objects and to generate remote RS events 210 and local RS events 212 as discussed above.

The remote RS events 210 and local RS events 212 are provided to RS event processor 404, which validates selected ones of the RS events 210 and 212, fences invalidated ones of the selected RS events, generates file system operations based on the RS events, excluding those RS events which have been invalidated and fenced, and causes the file system operations to be applied to RFS 202 and LFS 204 to bring them into synchronization. RS event validation is implemented by using remote SSS events 214 and local SSS events 216 to validate those remote RS events 210 and local RS events 212, respectively, which are indicative of a file system object being deleted. In particular, those of remote RS events 210 and local RS events 212 that are indicative of a file system object being deleted are validated against remote SSS events 214 and local SSS events 216, respectively, by using the SSS events to confirm that the file system object associated with the RS event should no longer be present in RFS 202 or LFS 204.

To facilitate validation, when an FRS or LRS is initiated, RS event processor 404 builds a plurality of RFS delete validation lists 406 and 408 and a plurality of LFS delete validation lists 410 and 412 using at least some of the available remote SSS events 214 and local SSS events 216.

Such available SSS events include those that have been generated and are awaiting SSS synchronization when the RS was triggered.

In this embodiment, two delete validation lists are built for each of RFS 202 and LFS 204. The delete validation lists for validating selected ones of remote RS events 210 are RFS UNLINK validation list 406 and RFS RMDIR validation list 408. Similarly, the delete validation lists for validating selected ones of local RS events 212 are LFS UNLINK validation list 410 and LFS RMDIR validation list 412.

RS event processor 404 builds the RFS UNLINK validation list 406 and RFS RMDIR validation list 408 from the available remote SSS events 214 in the following fashion:

For each remote SSS event 214:
   (1) if the remote SSS event 214 is a delete folder event (RMDIR), then add the path for the remote SSS event 214 to the RFS RMDIR validation list 408;
   (2) if the remote SSS event 214 is a delete file event (UNLINK), then add the path for the remote SSS event 214 to the RFS UNLINK validation list 406;
   (3) if the remote SSS event 214 is a rename file event (RENAME_FILE), then add the corresponding source event path (RSF) to the RFS UNLINK validation list 406; or
   (4) if the remote SSS event 214 is a rename folder event (RENAME_FOLDER), then add the corresponding source event path (RSD) to the RFS RMDIR validation list 408.

The first "if" statement in the above routine adds the path of any remote SSS event 214 indicative of a delete folder event to the RFS RMDIR validation list 408. Similarly, the second "if" statement adds the path of any remote SSS event 214 indicative of a file delete event to the RFS UNLINK validation list 406. In the third "if" statement, the path of the source event of the RENAME_FILE event is added to RFS UNLINK validation list 406, because the RENAME_FILE SSS event is equivalent to a delete (UNLINK) RS event for the source file plus a create (CREATE) RS event for the destination file as explained above. Accordingly, the SSS event path for the source file is added to the RFS UNLINK validation list 406, so that a corresponding delete (UNLINK) RS event can be validated. (Recall that RENAME_FILE and RENAME_FOLDER SSS events are stored from both the source and destination path perspectives as explained above.) Similarly, for the fourth "If" statement, the source path of the RENAME_FOLDER event is added to RFS RMDIR validation list 408, because the RENAME_FOLDER SSS event is equivalent to a delete folder (RMDIR) RS event for the source folder plus a create folder (MKDIR) RS event for the destination folder.

RS event processor 404 builds the LFS UNLINK and RMDIR validation lists 410 and 412 using the local SSS events 216 in substantially the same manner. In particular:

For each local SSS event 216:
   (1) if the local SSS event 216 is a delete folder event (RMDIR), then add the path for the local SSS event 216 to the LFS RMDIR validation list 412;
   (2) if the local SSS event 216 is a delete file event (UNLINK), then add the path for the local SSS event 216 to the LFS UNLINK validation list 410;
   (3) if the local SSS event 216 is a rename file event (RENAME_FILE), then add the corresponding source event path (RSF) to the LFS UNLINK validation list 410; or
   (4) if the local SSS event 216 is a rename folder event (RENAME_FOLDER), then add the corresponding source event path (RSD) to the LFS RMDIR validation list 412.

Once the RFS UNLINK and RMDIR validation lists 406 and 408 and the LFS UNLINK and RMDIR validation lists 410 and 412 are built, then RS event processor 404 validates selected ones of the remote RS events 210 using the RFS UNLINK and RMDIR validation lists 406 and 408 and validates selected ones of the local RS events 212 using the LFS UNLINK and RMDIR validation lists 410 and 412. In particular, ones of the remote RS events 210 that are indicative of deleted files are validated against the RFS UNLINK validation list 406. Similarly, ones of the remote RS events 210 that are indicative of deleted folders are validated against the RFS RMDIR validation list 408. The remote RS events 210 are validated against the RFS validation lists 406 and 408 as follows:

For each remote RS events 210:
   (1) If the remote RS event 210 is a delete file (UNLINK) event, then:
      If the path associated with the remote RS event 210 is not in the RFS UNLINK validation list 406, then fence (invalidate) the remote RS event 210; or
   (2) If the remote RS event 210 is a delete folder event (RMDIR), then:
      If the path associated with the remote RS event 210 is not in the RFS RMDIR validation list 408, then fence (invalidate) the remote RS event 210.

This process fences (invalidates) remote RS events 210 that are associated with a file being deleted (UNLINK) or a folder being deleted (RMDIR) and that cannot be validated using the RFS UNLINK and RMDIR validation lists 406 and 408, respectively.

Similarly, the local RS events 212 are validated against the LFS validation lists 410 and 412 as follows:

For each local RS events 212:
   (1) If the local RS event 212 is a delete file event (UNLINK), then:
      If the path associated with the local RS event 212 is not in the LFS UNLINK validation list 410, then fence (invalidate) the local RS event 212; or
   (2) If the local RS event 212 is a delete folder event (RMDIR), then:
      If the path associated with the local RS event 212 is not in the LFS RMDIR validation list 412, then fence (invalidate) the local RS event 212.

This process similarly fences (invalidates) local RS events 212 that are associated with a file being deleted (UNLINK) or with a folder being deleted (RMDIR) and that cannot be validated against the LFS UNLINK and RMDIR validation lists 410 and 412, respectively.

As illustrated in FIG. 4, event processor 404 fences remote RS events 414 and local RS events 416 that are invalidated during the validation process. Event fencing can be accomplished in a variety of ways. For example, RS event processor 404 can fence invalidated RS events by deleting them such that file system operations are not generated based on the invalidated events. As another example, RS event processor 404 can fence invalidated events by ignoring them when generating file system operations. This can be accomplished, for example, by flagging invalidated RS event records. As still another example, synchronization operations generated based on invalidated RS events can be deleted, ignored, or trapped so they are not applied to RFS 202 or LFS 204. These and other fencing options will be apparent in view of this disclosure.

RS event processor 404 generates file system operations based on the validated remote and local RS events 210 and 212, as well as the remote and local RS events 210 and 212 that were not subject to validation, and applies those file system operations to RFS 202 and LFS 204 as appropriate to complete the FRS or LRS and synchronize RFS 202 and LFS 204. RS event processor 404 could also optionally cause LVS database 209 to be updated.

Figure 5:
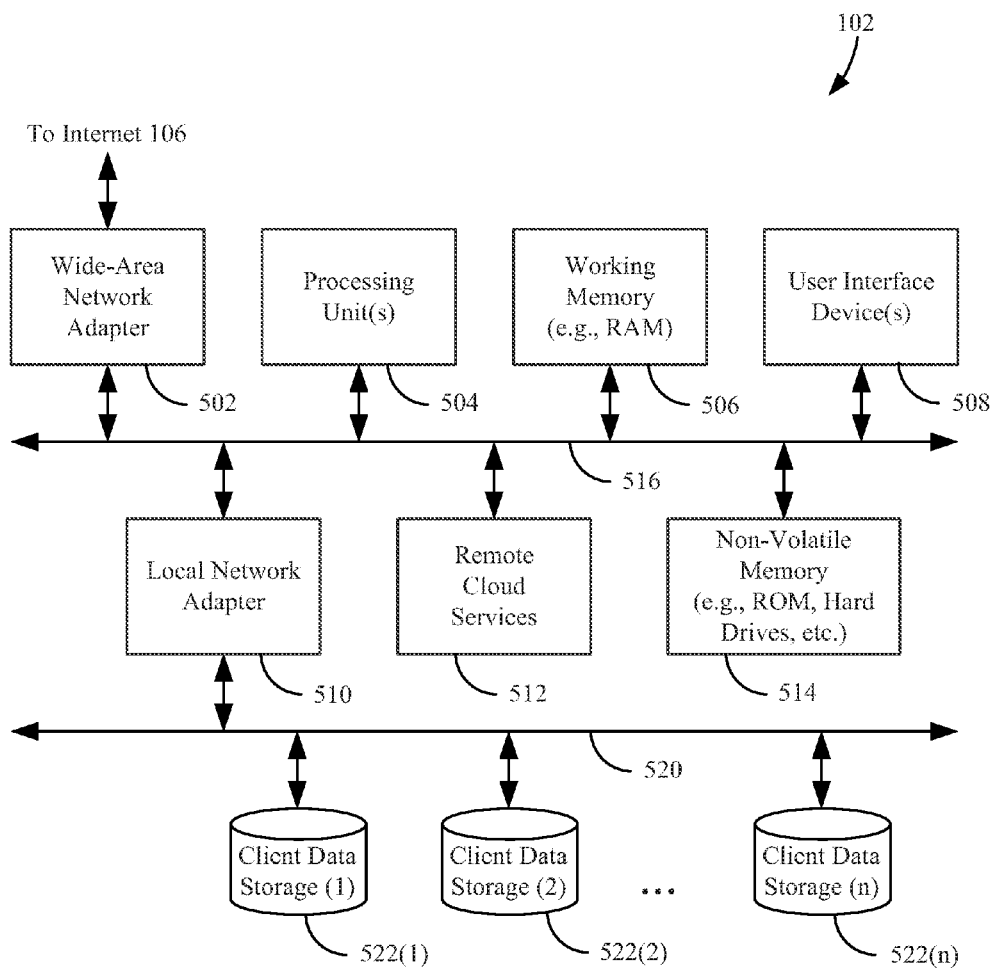
FIG. 5 is a block diagram of a remote file storage system.

FIG. 5 is a block diagram of remote cloud server 102. Remote cloud server 102 includes a wide-area network adapter 502, one or more processing units 504, working memory 506, one or more user interface devices 508, a local network adapter 510, a remote cloud services component 512, and non-volatile memory 514, all intercommunicating via an internal bus 516. Processing units(s) 504 impart functionality to remote cloud server 102 by executing code stored in any or all of non-volatile memory 514, working memory 506, and remote cloud services 512. Remote cloud services 512 represents hardware, software, firmware, or some combination thereof, that provides the synchronization and delete validation and fencing functionality described herein.

Wide area network adapter 502 provides a means for remote cloud server 102 to communicate with remote users 114 and local cloud 104 via Internet 106. Local network adapter 510 provides a means for accessing a plurality of data storage devices 522(1-n), via a private network 520. Clients' files are stored in and retrieved from data storage devices 522(1-n) as needed. Additional data storage devices 522(n+) can be added as needed to provide additional storage capacity. In this example embodiment, data storage devices 522(1-n) are network attached storage (NAS) devices, but any suitable type of storage device can be used.

Cloud-based object storage infrastructures are further described in U.S. Publication No. 2014/0149794 A1, dated May 29, 2014 by Shetty et al. and entitled "System And Method Of Implementing An Object Storage Infrastructure For Cloud-Based Services", which is incorporated herein by reference in its entirety. Furthermore, permission management frameworks for cloud servers is described in U.S. Publication No. 2014/0149461 A1, dated May 29, 2014 by Wijayaratne et al. and entitled "Flexible Permission Management Framework For Cloud Attached File Systems", which is also incorporated herein by reference in its entirety.

Figure 6:
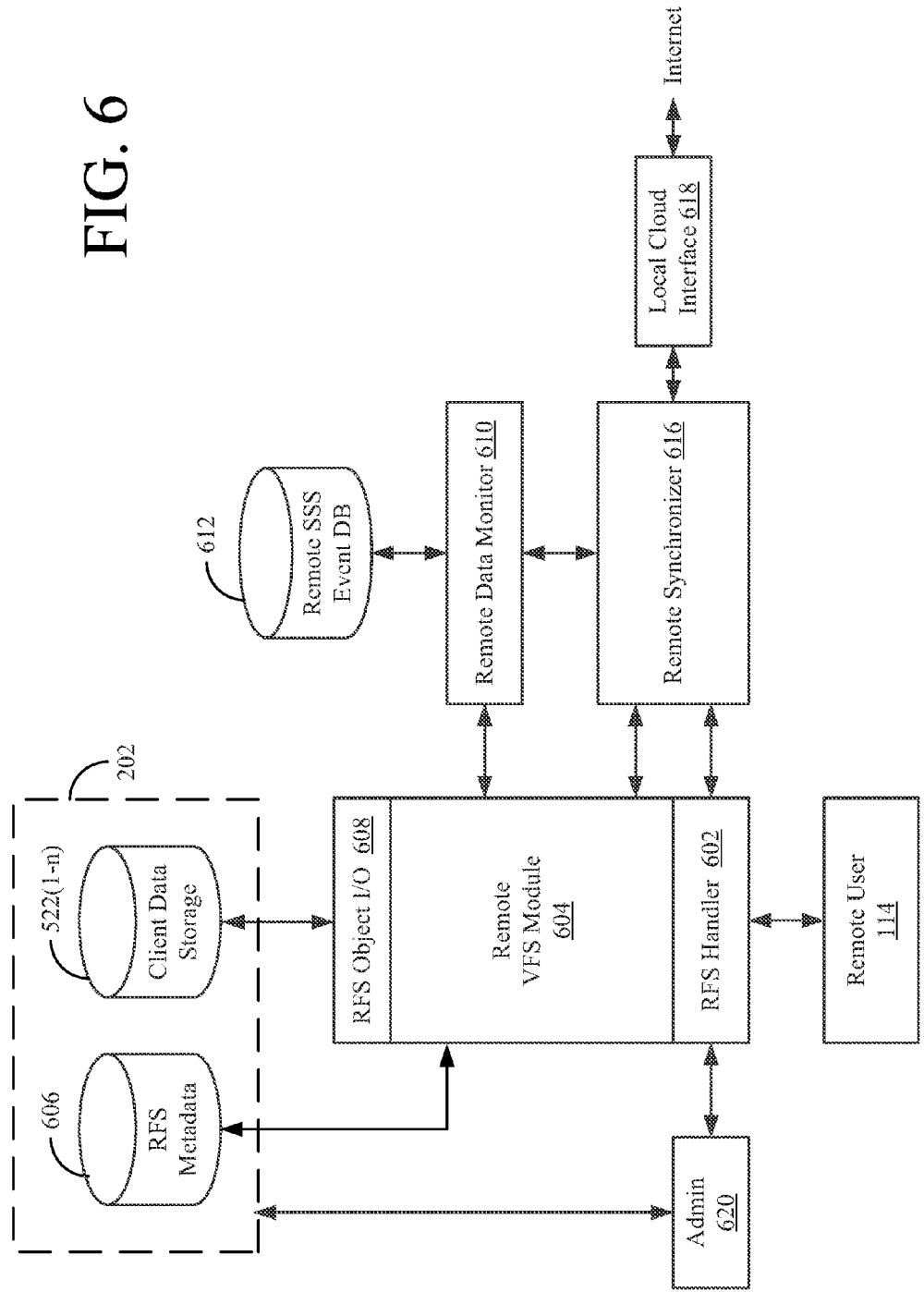
FIG. 6 is a relational diagram of the functional aspects of the remote cloud storage system of FIG. 5 according to the present invention.

FIG. 6 is a relational diagram showing the functional aspects of remote cloud server 102. In the illustrated embodiment, the functional aspects are provided by remote cloud services 512 but could be distributed across other service modules or even other machines as desired.

Remote user 114 is a device and/or process used to access files in RFS 202 via an RFS handler 602. Remote user 114 connects with RFS handler 602 either via the Internet 106 or via connections 116 (FIG. 1). RFS handler 602 represents an interface/protocol by which remote users 114 can access and modify RFS 202. For example, RFS handler 602 can be an interface implementing HTTP, WebUI, WebDAV, RESTful application program interfaces (APIs) and/or FTP, an interface compatible with a mobile application (e.g., an application running on a smartphone, tablet, etc.), etc. Responsive to communication with remote user 114, RFS handler 602 calls remote virtual file system (VFS) module 604, which facilitates access to RFS 202.

As shown in FIG. 6, RFS 202 includes both an RFS metadata database 606 and data files stored on data storage devices 522(1-n). Metadata database 606 stores metadata (e.g., data defining virtual files and folders, permissions, etc.) that describes a hierarchical, virtual file system that remote client 114 can use to access file system objects and make changes to RFS 202. The metadata in database 606 stores paths (or some other identifier or pointer) to the associated client data files stored on data storage devices 522(1-n), so that associated file system objects can be accessed, updated, and created on devices 522(1-n) in accordance with changes made by the remote client 114 to virtual RFS 202. Metadata database 606 can be stored in data storage devices 522(1-n).

Remote VFS module 604 provides remote user 114 with file and folder access to RFS 202, for example, after authenticating remote user 114. Remote VFS module 604 intercepts the file system calls coming from remote user 114 via RFS handler 602 and enforces cloud permissions on file system access. If access is permitted, remote VFS module 604 utilizes metadata stored in RFS metadata database 606 to provide remote user 114 with a hierarchical virtual file system view of the namespace (e.g., a directory tree view of folders and files) via which the remote user 114 can access and make changes to remote file system objects. When a data file needs to be uploaded to, downloaded from, or deleted from client data storage devices 522(1-n), remote VFS module 604 utilizes RFS object I/O module 608 to facilitate the data file operation.

RFS object I/O module 608 manages the I/O subsystem for organized data file storage and access on data storage devices 522(1-n). Responsive to VFS module 604, RFS object I/O module 608 downloads associated data files from, uploads associated data files to, and deletes associated data files from data storage devices 522(1-n). I/O module 608 also provides and receives the requisite files from VFS module 604. Similarly, VFS module 604 provides data files to, and retrieves data files from, remote client 114 as needed via RFS handler 602.

RFS 202 can be viewed as including a control plane and a data plane. The control plane includes the metadata in RFS metadata database 606, which the remote user 114 can access and change via the virtual file system and remote VFS module 604. The data storage devices 522(1-n) represent the data plane, which the remote user 114 does not have direct access to or control over. Rather, changes are propagated to the data plane based on changes that the client makes to the virtual file system via the control plane.

Recall that remote SSS events 214 represent changes that are made to RFS 202. Remote VFS module 604 facilitates event-based, steady state synchronization between RFS 202 and LFS 204 by trapping information regarding any changes made to RFS 202 as they occur (i.e., when changes are made to the virtual file system by a user/client) and providing remote SSS event information to a remote data monitor 610. In particular, remote VFS module 604 monitors I/O requests from remote user 114 and provides remote SSS event information to remote data monitor 610 when remote VFS module 604 receives an I/O request that changes the remote virtual file system defined by RFS metadata 606.

For each remote SSS event 214, remote data monitor 610 receives the remote SSS event information from remote VFS module 604, and then records the remote SSS event 214 in a remote SSS event database 612. Optionally, remote data monitor 610 can filter irrelevant and/or redundant remote SSS events (e.g., by implementing phase 0-1 processing described below, etc.) from database 612. Additionally, remote data monitor 610 can notify a remote synchronizer 616 of the occurrence of remote SSS event(s) 212 and can receive synchronization commands from remote synchronizer 616. For example, responsive to a request for remote SSS events from remote synchronizer 616, remote data monitor 610 can retrieve the requested remote SSS events 214 from remote SSS event database 612 (e.g., for an event synchronization period) and provide them to remote synchronizer 616. Remote data monitor 610 can also periodically delete the remote SSS events from remote event database 612, for example, once the events are provided to remote synchronizer 616 or following a command from remote synchronizer 616 after successful event synchronization.

Remote SSS event database 612 provides storage for the records of a plurality of remote SSS events 214. These remote SSS events 214 are maintained according to a scalable relational database structure. Records of remote SSS events 214 are stored in remote SSS event database 612 in chronological order as events occur. However, remote SSS event database 612 can return remote SSS events 214 in any desirable order, such as chronologically, according to the hierarchy of the virtual file system, etc.

Remote synchronizer 616 controls and coordinates the synchronization process between remote cloud server 102 and local cloud server 104 on the remote cloud side. For example, remote synchronizer 616 can receive commands from local cloud server 104, via internet 106 and a local cloud interface 618, to initiate synchronization. In response, remote synchronizer 616 can request remote SSS events 214 from RFS data monitor 610, receive the remote SSS events 214, and provide the remote SSS events 214 to local cloud 104 via local cloud interface 618. In other embodiments, remote synchronizer 616 can periodically provide the remote SSS events 214 to local cloud 104 without the events being requested by local cloud 104. In still other embodiments, remote synchronizer 616 can contact local cloud server 104 via interface 618 and initiate the synchronization process, for example, in response to remote synchronizer 616 receiving notification of a remote event from remote data monitor 610, a command from a remote cloud administrator 620, too much time elapsing since a last synchronization, to cause a rescan synchronization to be initiated, etc.

Remote synchronizer 616 also facilitates the different snapshot-based RS processes discussed above in FIG. 2A. For example, responsive to a snapshot request received via local cloud interface 618, remote synchronizer 616 is operative to request the appropriate snapshot of RFS 202 from remote data monitor 610. For example, for an FFS or FRS, remote synchronizer 616 would request a metadata snapshot of all or some of metadata 606 for all synchronized paths of RFS 202. However, for an LRS, remote synchronizer 616 requests a snapshot of only the requested portion of RFS metadata 606, for example, for a particular set of paths and child directories. In response, remote data monitor 610 queries VFS module 604 for the appropriate metadata snapshot. VFS module 604 uses RFS metadata 606 to prepare the appropriate RFS metadata snapshot 206 and provides the snapshot 206 to remote data monitor 610. Remote data monitor 610, in turn, provides the metadata snapshot 206 to remote synchronizer 616, and remote synchronizer 616 provides the RFS snapshot 206 to the local cloud server 104 via local cloud interface 618. Optionally, remote synchronizer 616 could communicate directly with VFS module 604 or RFS metadata database 606 to obtain the snapshot.

The RFS metadata snapshot 206 can be in any convenient format (e.g., flat file, comma separated value, WL, JSON, etc.). In a particular embodiment, the RFS metadata snapshot is in flat file format (lines of text) with one object per line and tabs separating the object attributes in the line. Additionally, the RFS metadata snapshot 206 can include all or only some metadata attributes for each file system object. Examples of file attributes that can be included in the RFS metadata snapshot include, but are not limited to, an entry identifier (facilitates multiple versions of files), one or more paths or path information (e.g., canonical path, display path, canonical name, etc.), modification time, size, and checksum. Similarly, folder attributes that can be included in the RFS metadata snapshot 206 include, but are not limited to, an entry identifier, canonical path, display path, and modification time.

Remote synchronizer 616 is also operative to receive file system synchronization operations and data for modifying RFS 202 from local cloud server 104 via interface 618 and to provide those synchronization operations and data to RFS handler 602. RFS handler 602, in turn, causes the synchronization operations and data to be applied to RFS 202 via remote VFS module 604 as described above. The synchronization operations represent changes associated with local SSS events 216 or local RS events 212 that are being applied to RFS 202 as part of the synchronization process according to the invention.

Synchronization operations can include any file system operations that are recognized by the protocol(s) implemented by RFS handler 602 (e.g., upload, download, delete, move, create, rename, etc.). The file system operations cause changes in RFS metadata database 606 and/or client data stores 522(1-n) as part of the synchronization process. For example, the synchronization operations can cause a file or folder to be created, deleted, renamed, or moved in the metadata virtual file system (namespace) defined by RFS metadata 606. As another example, the file system operations can also cause a file to be uploaded to, downloaded from, deleted from, updated, etc. in the client data stores 522(1-n). Other file system operations (e.g., attribute modifications, restore from trash, etc.) can also be implemented.

Finally, local cloud interface 618 is a means by which remote cloud server 102 can establish an internet connection with local cloud server 104 and intercommunicate as needed, for example, by HTTP, complementary application program interfaces (APIs), etc. In a particular embodiment, local cloud interface 618 maintains an open (always on) connection with local cloud 104 for efficient synchronization.

Figure 7:
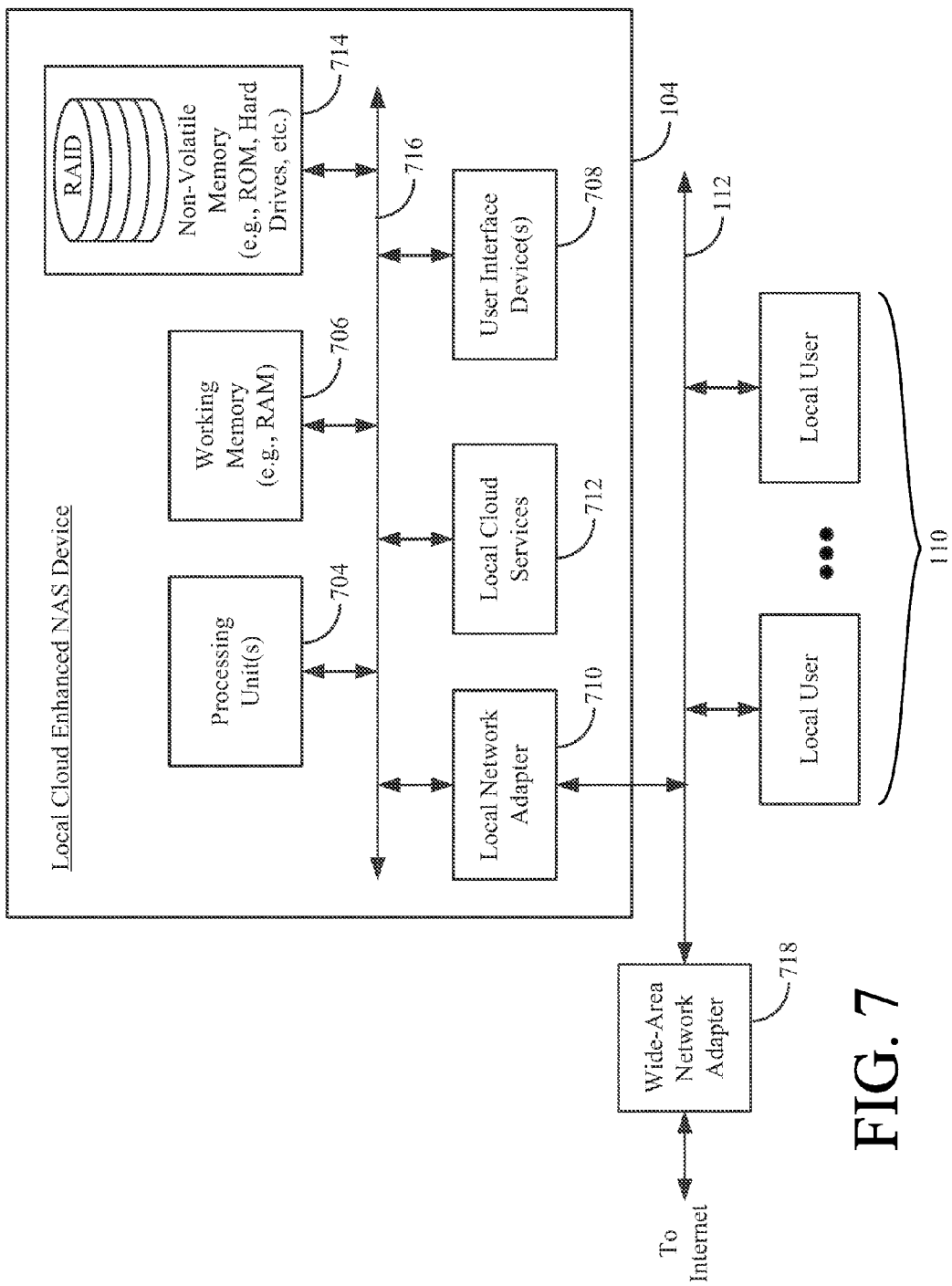
FIG. 7 is a block diagram of a local file storage system.

FIG. 7 is a block diagram showing local cloud server 104 in greater detail according to one embodiment of the present invention. In this embodiment, local cloud server 104 is an enhanced network attached storage (NAS) device that includes one or more processing units 704, working memory 706, one or more user interface devices 708, a local network adapter 710, a local cloud services component 712, and non-volatile memory 714, all intercommunicating via an internal bus 716. Processing units(s) 704 impart functionality to local cloud server 104 by executing code stored in any or all of non-volatile memory 714, working memory 706, and local cloud services 712. A wide-area network adapter 718 facilitates communication with remote cloud server 102 (FIG. 1) via local network 112 and the Internet 106.

Non-volatile memory 714 also provides local file storage for a client's local file system 204. By way of example, the nonvolatile memory 714 is shown to include (in addition to other types of memory) a set of hard drives arranged in a RAID configuration. The client's file system on the RAID drives can be accessed by local users 110 via local network 112, as is known in the art, for example over a Server Message Block (SMB) connection. While a NAS device is used in this example of local cloud server 104, local cloud 104 could also be implemented using a virtual machine (VM) running an operating system that allows file access over an SMB share.

Local cloud services 712 represents hardware, software, firmware, or some combination thereof, that provides the synchronization and delete fencing functionality described herein. Local cloud services 712 also provide file storage and retrieval services to local users 110. The file storage functionality of local cloud services 712 will not be described in detail herein, except to the extent it relates to the synchronization and delete fencing aspects, so as not to unnecessarily complicate this disclosure.

Figure 8:
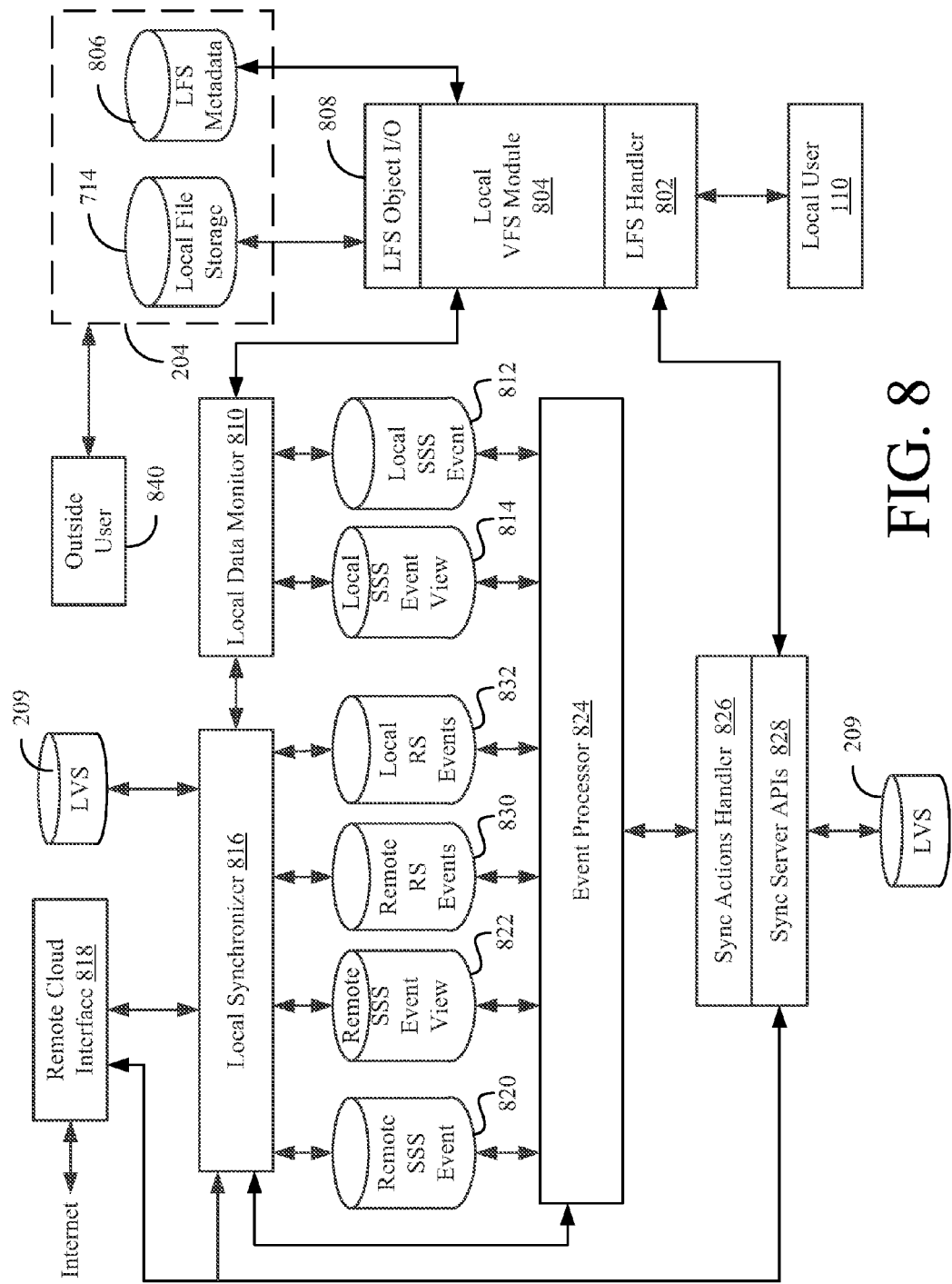
FIG. 8 is a relational diagram of the functional aspects of the local cloud storage server of FIG. 7 according to the present invention.

FIG. 8 is a relational diagram of the functional aspects of local cloud server 104. In this illustrated embodiment, the functional aspects are provided by local cloud services 712 but can be distributed across other service modules or even other machines.

LFS handler 802 receives requests for access (e.g., logins, read requests, write requests, etc.) from local users 110. In this particular example, local users 110 are WINDOWS® clients, and LFS handler 802 includes a server application implementing Samba, which allows local cloud 104 to interact with the local users 110 via an SMB connection. However, the present invention is not so limited. Indeed, a significant advantage of the present invention is that it can be implemented with a wide variety of server applications and file system protocols (e.g., NFS, etc.). Local user 110 includes a device/process used to access the objects in LFS 204 that are hosted by local cloud server 104. A user maps the "share" that is exported by LFS handler 802 (e.g., via Common Internet File System (CIFS), SMB, etc.) and then accesses the files and folders within the exported share.

Local VFS module 804 facilitates file and folder access to LFS 204 for a local user 110, for example, after authenticating local user 114. Local VFS module 804 receives the file system calls coming from local user 110 via LFS handler 802 and enforces permissions on file system access. Local VFS module 804 also monitors the actions of local users 110 to detect changes being made to LFS 204 by the local users 110. When local VFS module 804 detects a change to LFS 204, local VFS module 804 modifies the LFS metadata 806 to record the change. LFS object I/O module 808 manages the I/O subsystem for organized storage and access of data files stored in local file storage 714 on LFS 204. Local VFS module 804 conveys data objects between LFS handler 802 and LFS Object I/O module 808 when files need to be transferred between local cloud server 104 and local users 110.

Local VFS module 804 is also operative to help record local SSS events 216 as those events are caused by local users 110. When local VFS module 804 detects a local SSS event 216 (e.g., a change to LFS 204 made by local client 110), local VFS module 804 generates local SSS event information based on the local SSS event and provides the local SSS event information to local data monitor 810. In this embodiment, the types of local SSS events 216 are the same as the types of remote SSS events 214; however, the types could be different if desired.

Local data monitor 810 receives the local SSS event information from local VFS module 804 for each local event, and then records a local SSS event 216 in a local SSS event database 812. Local SSS event database 812 provides storage for local SSS events in a scalable relational database structure. Records of local SSS events are stored in local SSS event database 812 in chronological order as local SSS events occur, but could be retrieved in any desirable order. Optionally, local data monitor 810 can filter irrelevant and/or redundant local SSS events from database 812 (e.g., by implementing phase 0-1 processing as described below, etc.). If data monitor 810 crashes during SSS event generation, a rescan synchronization can be initiated by local synchronizer 816.

Local data monitor 810 can also notify a local synchronizer 816 of pending local SSS event(s) 216 in local SSS events database 812, for example, when data monitor 810 generates the local SSS event 216. Local data monitor 810 is also responsive to commands from local synchronizer 816 to help facilitate synchronization. For example, local data monitor 810 is responsible for copying/moving local SSS events 216 from local SSS event database 812 to a local SSS event view database 814 for synchronization purposes over an event synchronization period indicated by local synchronizer 816.

Local SSS event view database 814 stores local SSS events 216 that are undergoing steady-state synchronization. The data structure for database 814 is the same as for database 812, such that local SSS event records stored in database 812 can be easily copied/moved to view database 814. Once local data monitor 810 moves the local SSS event 216 from local database 812 to local SSS event view database 814, the local SSS events 216 stored in local SSS event view database 814 are considered being processed for synchronization and are removed from local SSS event database 812 by local data monitor 810.

Local synchronizer 816 is responsible for driving the SSS and snapshot-based synchronization processes between the remote cloud server 102 and the local cloud server 104. Accordingly, local synchronizer 816 will periodically initiate SSS and snapshot-based synchronizations. For example, local synchronizer 816 can initiate an FFS when RFS 202 and LFS 204 are to be synchronized for the first time, for example, responsive to the client opening an account with the cloud service provider operating remote cloud server 102. Additionally, local synchronizer 816 can trigger an FRS or LRS upon receiving an indication (e.g., from event processor 824, from remote cloud server 102, etc.) that a rescan synchronization is required.

Local synchronizer 816 can also initiate steady state synchronization in several ways. For example, local synchronizer 816 can initiate an SSS after local data monitor 810 notifies it of pending SSS events in one or databases 812 and 814, or it can initiate synchronization periodically, for example, according to a time period defined by the client or by the system (e.g., every minute, every 15 minutes, etc.). As still another example, local synchronizer 816 can initiate synchronization upon receiving an instruction and/or one or more remote SSS events 814 from remote cloud server 102 via remote cloud interface 818. These and other methods of initiating synchronization will be apparent in view of this disclosure.

Local synchronizer 816 periodically receives (and optionally requests) remote SSS events 214 from remote cloud server 102 via remote cloud interface 818 and internet 106. When remote SSS events 214 are received, local synchronizer 816 stores records of the remote SSS events 214 in a remote SSS event database 820. When synchronization is initiated, local synchronizer 816 copies at least some of the remote SSS events 214 (e.g., those associated with an event synchronization period) in remote SSS event database 820 to a remote SSS event view database 822. Local synchronizer 816 then causes the copied remote SSS event records to be deleted from remote SSS event database 820, optionally after successful synchronization occurs. The data structures for remote databases 612, 820, and 822 are the same in the present embodiment.

Synchronizer 816 further coordinates and carries out parts of the snapshot-based synchronization processes. In particular, when a snapshot-based synchronization is initiated, local synchronizer 816 is operative to obtain an RFS snapshot 206 (e.g., the RFS Metadata 806) of RFS 202 and an LFS snapshot 208 (e.g., the LFS Metadata 806) of LFS 204 and store each of the snapshots 206 and 208 in LFS 204 as a file. For example, local synchronizer 816 can request a metadata snapshot 206 of RFS 202 from remote cloud 102 via remote cloud interface 818. Local synchronizer 816 can also obtain a metadata snapshot 208 of LFS 204 via local data monitor 810 and local VFS module 804. Optionally, local synchronizer 816 can access LFS metadata 806 directly to obtain its metadata snapshot of LFS 204. The remote and local snapshots 206 and 208 can be requested for the entire synchronized namespace (e.g., in the case of FFS and FRS) or for only parts of the synchronized namespace (e.g., in the case of LRS).

Once obtained, local synchronizer 816 compares the snapshot files and, in the cases of FRS and LRS, the data in LVS database 209 to ascertain differences between RFS 202 and LFS 204. As the differences between RFS 202 and LFS 204 are ascertained, local synchronizer 816 generates remote and local RS events 210 and 212 indicating the differences between RFS 202 and LFS 204. Local synchronizer 816 stores records of the remote and local RS events 210 and 212 in remote RS events database 830 and in local RS events database 832, respectively.

Local synchronizer 816 also communicates with an event processor 824, which processes RS and SSS events, performs delete fencing, and generates file system operations for applying to RFS 202 and LFS 204 to complete synchronization. For example, local synchronizer 816 can instruct event processor 824 to begin processing RS events associated with a particular snapshot-based synchronization routine or to begin processing SSS events associated with a particular event synchronization period. Local synchronizer 816 can also receive communications from event processor 824. For example, event processor 824 can notify synchronizer 816 that event processing is completed for a particular synchronization.

Event processor 824 processes RS events and SSS events for synchronization as will be described in more detail below. For a snapshot-based synchronization, event processor accesses the remote and local RS events 210 and 212 stored in remote RS events database 830 and local RS events database 832, respectively, validates selected ones of the RS events using pending SSS events, fences any invalidated RS events, and then generates file system operations to be applied to RFS 202 and LFS 204 to synchronize the file systems. For an SSS, event processor 824 accesses SSS events associated with an event synchronization period from local SSS event view database 814 and remote SSS event view database 822, processes the remote and local SSS events to reduce their number and resolve conflicts, and then generates the appropriate file system operations to be applied to RFS 202 and LFS 204 to synchronize them.

Event processor 824 outputs the file system operations that it generates to sync actions handler 826. Sync actions handler 826 receives the file system operations and applies the file system operations to RFS 202 and LFS 204 using a set of sync server application program interfaces (APIs) 828. APIs 828 enable sync actions handler 826 to apply file system operations to LFS 204 via LFS handler 802, for example, with complementary APIs. APIs 828 also enable sync actions handler 826 to communicate RFS file system operations to RFS 202 via remote cloud interface 818 and internet 106. Remote cloud server 102 then receives the file system operations via local cloud interface 618 (FIG. 6), for example via complementary APIs. Remote synchronizer 616 would then apply the received file system operations to RFS 202 via RFS handler 802. (Optionally, event processor 824 could instead provide the file system operations to synchronizer 816 for conveying to remote cloud server 102.)

File system operations that can be applied to RFS 202 and LFS 204 include, but are not limited to, pushing (uploading) files and folders, pulling (downloading) files and folders, creating files and folders, moving files and folders, deleting files and folders, renaming files and folders, restoring files and folders from the trash, merging files and folders, and any other desirable actions. It should also be noted that sync actions handler 826 can optionally use different APIs depending on the situation, including the number of file system operations that have to be applied, the number of files that have to be transmitted, the size of the files that have to be transmitted, etc.

Sync actions handler 826, via APIs 828, is also operative to update LVS database 209 as paths are successfully synchronized. Once a path is successfully synchronized, sync actions handler 826 will update the corresponding record in LVS database 209. In an alternative embodiment, a different element (e.g., local synchronizer 816) could update LVS database 209. As mentioned above, if synchronization fails then spurious records can remain in LVS database 209. In another embodiment, an event feedback loop (EFL) can be used, where events for individual items that could not be synced (e.g., if a file was locked, etc) are also stored. The synchronization of these objects can then be attempted again in a subsequent sync period.

As will be apparent from the description thus far, the described synchronization processes are primarily implemented and controlled by the local cloud server 104. However, the functional elements of remote cloud server 102 (FIG. 6) and local cloud server 104 (FIG. 8) could be reversed, such that the remote cloud primarily implements synchronization. As another example, the functional elements of the local cloud server 104 could be replicated on the remote cloud server 102, such that either server could carry out the particular functions described herein.

Figure 9:
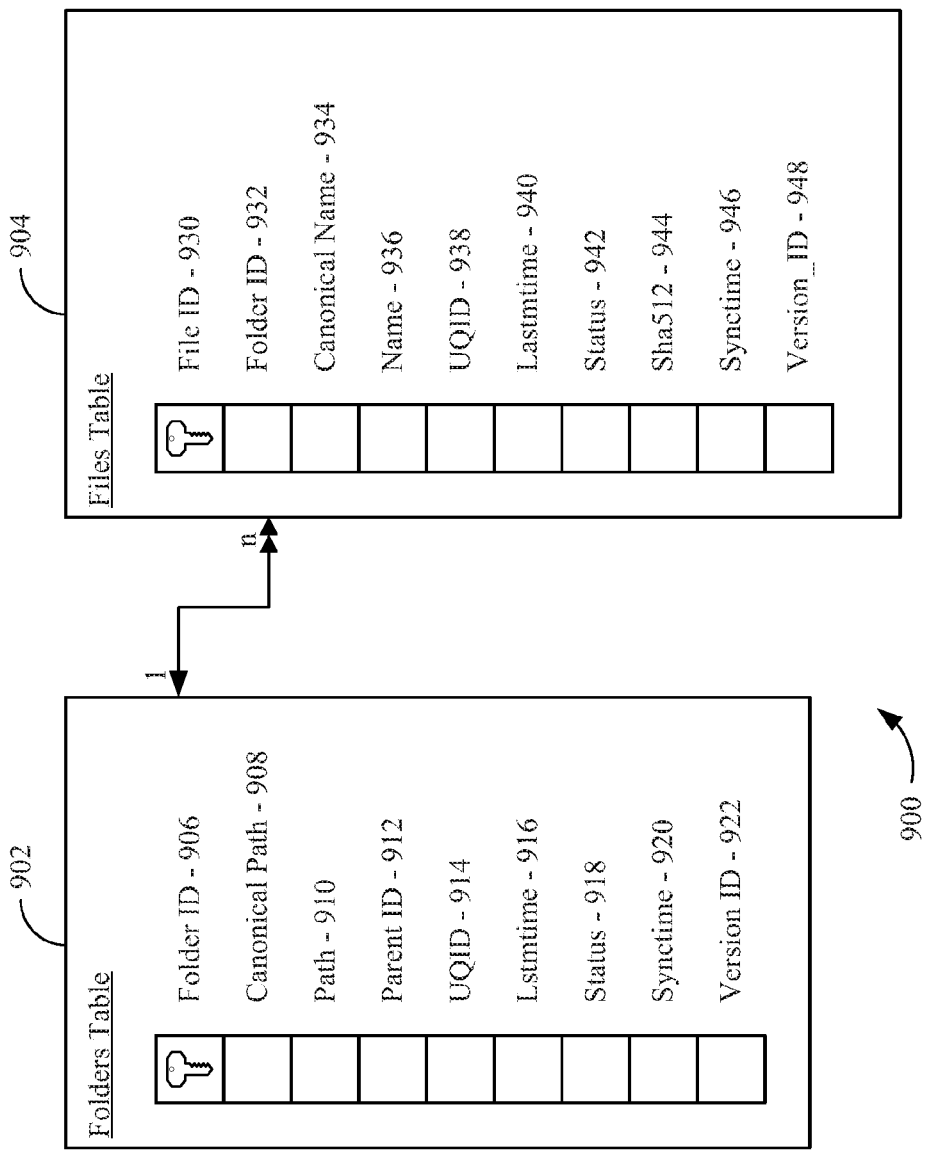
FIG. 9 shows an exemplary data structure for a Last Valid Sync (LVS) database of FIG. 2 and/or for file system metadata of the local and/or remote file systems.

FIG. 9 shows a data structure 900 for storing data in LVS database 209. LVS database 209 contains the extended attributes related to file synchronization for each file and folder that is successfully synchronized on RFS 202 and LFS 202. Thus, each synchronized object in RFS 202 and LFS 204 will have an entry in LVS database 209, and LVS database 209 can be rather large. Local synchronizer 816 and/or sync actions handler 826 (via APIs 828) updates LVS database 209 after each successful synchronization by creating records, deleting records, modifying records, and/or populating records with the particular attribute information.

Data structure 900 includes a Folders table 902 and a Files table 904. Each record of Folders Table 902 represents a folder of the synchronized file system on RFS 202 and LFS 204 and includes a Folder ID field 906, a Canonical Path field 908, a Path field 910, a Parent ID field 912, a UQID field 914, a Lstmtime field 916, a Status field 918, a Synctime field 920, and a Version ID field 922. Folder ID field 906 is the key field that uniquely identifies the particular folder record. Canonical Path field 908 includes a standardized path name. Path field 910 includes a display path. Parent ID field 912 includes the Folder ID value of the parent folder of the folder represented by the current record. UQID field 914 includes data indicative of how many versions of the folder are kept on RFS 202. Lstmtime field 916 includes data indicative of the last time the associated folder was modified. Status field 918 includes data indicative of the synchronization status of the associated folder (e.g., synchronized, skipped, etc.). Synctime field 920 includes data indicative of the last time the associated folder was successfully synchronized. Version ID field 922 includes data indicative of the current version of the synchronized folder.

Each record of Files Table 904 represents a file of the synchronized file system and includes a File ID field 930, a Folder ID field 932, a Canonical Name field 934, a Name field 936, a UQID field 938, a Lstmtime field 940, a Status field 942, a Sha512 field 944, a Synctime field 946, and a Version ID field 948. File ID field 930 is the key field that uniquely identifies the particular file record. Folder ID field 932 includes data identifying a record in folder table 902, which corresponds to the folder in which the file resides. Canonical Name field 934 includes a standardized file name. Name field 936 includes data indicative of the display name. UQID field 938 includes data indicative of how many versions of the file are kept on RFS 202. Lstmtime field 940 includes data indicative of the last time the associated file was modified. Status field 942 includes data indicative of the synchronization status of the associated file (e.g., synchronized, skipped, etc.). Sha512 field 944 includes a checksum of the file. Synctime field 946 includes data indicative of the last time the associated file was successfully synchronized. Version ID field 948 includes data indicative of the current version of the associated file.

File systems are hierarchical, and relational databases are not very suitable for storing such large hierarchical data structures. When folder deletes and folder renames are executed in the relational database model, extensive searches and modifications are required for path prefixes. For large databases hosted on resource constrained storage appliances, these requirements are too prohibitive. The data structure of LVS database 209 greatly reduces the prefix search space and update operations. In particular, folder modifications only require search and processing of Folders Table 902, and file modifications only require search and processing of the Files Table 904.

While data structure 900 is explained with reference to LVS database 209, data structure 900 (or one similar) can also be used for storing RFS metadata 406 and/or LFS metadata 806 of RFS 202 and LFS 204, respectively. Additionally, the tables and fields provided in FIG. 9 are exemplary in nature. Each folder and file record in tables 902 and 904 could include additional fields (e.g., fields for unique file system identifiers, HTTP endpoint information, etc.) or fewer fields as needed. Additional tables can also be included in data structure 900. For example, a table containing version metadata for each version of a file that was synchronized, stored in RFS 202, or stored in LFS 204 could be linked to the file records in files table 904.

As discussed above, local synchronizer 816 utilizes the entries in LVS database 209 to determine if RS events need to be generated when a snapshot-based synchronization is triggered. For example, during an initial FFS, local synchronizer 816 would generate RS events to synchronize the entire local and remote file systems 202 and 204, because no prior synchronization would have occurred and no entries would be recorded in folder table 902 or file table 904 of LVS database 209. Accordingly, responsive to each path being synchronized during an FFS, sync actions handler 826 (or local synchronizer 816) would create a record in the appropriate one of folders table 902 and files table 904 of LVS database 209 and fill the record with the appropriate attribute information (e.g., based on data contained in the metadata snapshot(s) 206 and 208, based on the information obtained during synchronization, etc.). LVS database 209 can also be recreated from scratch should a subsequent FFS be initiated.

In contrast, for an FRS or LRS, LVS database 209 will contain entries (optionally from both the RFS 202 and LFS 204 perspectives) for previously synchronized file system objects. Accordingly, when local synchronizer 816 is generating the RS events for the FRS or LRS, local synchronizer 816 consults the folder and file entries in LVS database 209 for each path to be synchronized to determine if that path was synchronized in the past. If the path exists, local synchronizer 816 can compare the metadata in the LFS and/or RFS snapshots 206 and 208 for the object to be synchronized with the extended attributes (metadata) in the LVS database 209 for that object. If the file system object has already been synchronized and has not been modified (e.g., based on a comparison of data in the metadata snapshot(s) 206 and 208 and in LVS database 209, such as the Sha512 fields 944, the Lstmtime field 916 or 940, etc.), then an RS event does not need to be generated to facilitate synchronization of that object again. As a result, LVS database 209 speeds up rescan synchronizations.

Sync actions handler 826 (via APIs 828) and/or local synchronizer 816 are operative to update LVS database 209 after each successful synchronization by creating entries, deleting entries, and/or populating entries with the particular attribute information. Entries would be created or updated in folders table 902 and files table 904 to reflect successful folder and file synchronizations, respectively. Similarly, records in folders table 902 and files table 904 would be deleted when a corresponding path was removed from RFS 202 and LFS 204. Entries in LVS database 209 are updated as file system objects are synchronized, whether synchronization results from a rescan or steady state synchronization routine.

Other attributes in folders table 902 and files table 904 can also be used by sync actions handler 826 and/or local synchronizer 816 to optimize and enhance rescan and/or steady-state synchronizations. For example, the checksum information in Sha512 field 944 can be used to determine if a file has been modified on RFS 202 or LFS 204 since the last synchronization.

Figure 10:
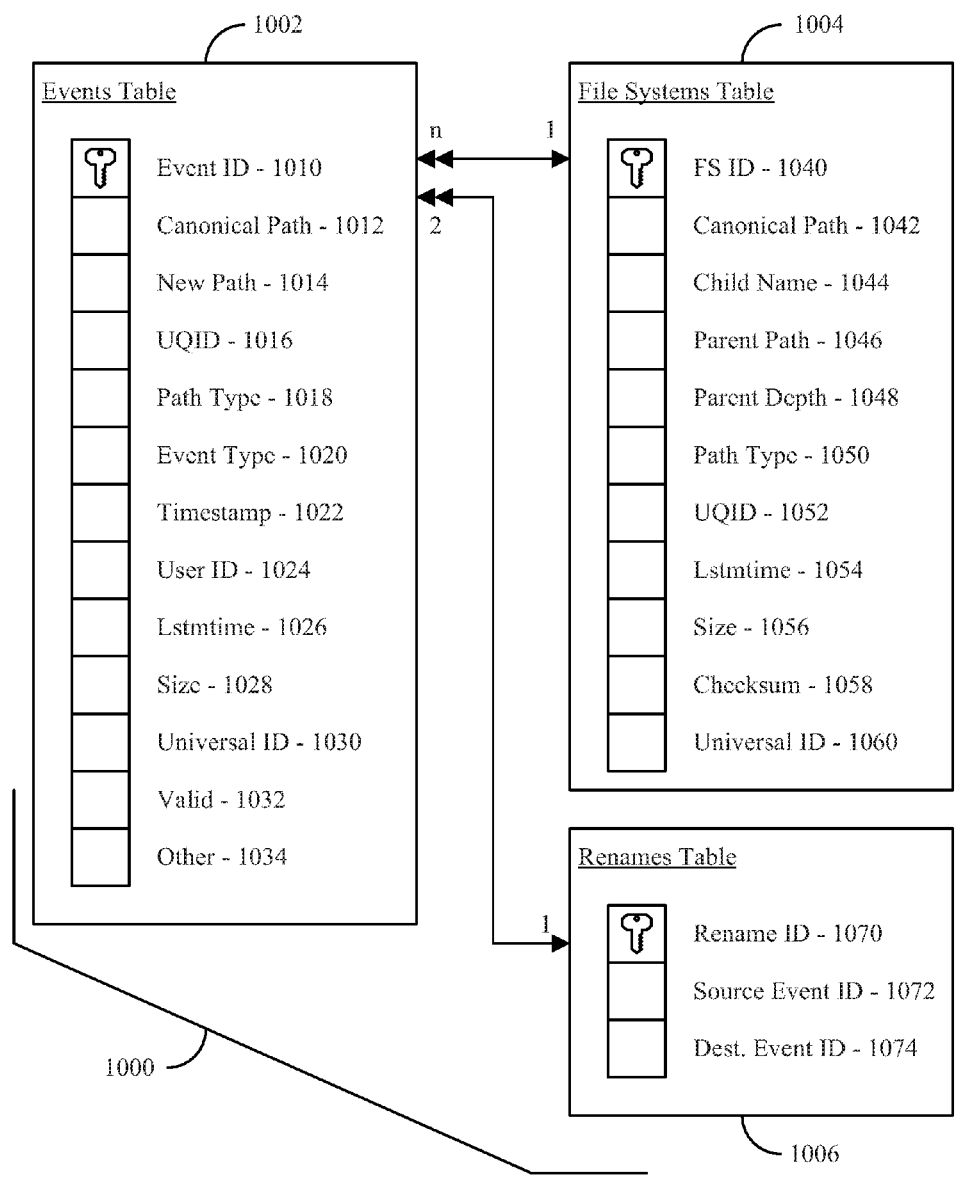
FIG. 10 shows an exemplary data structure for storing event records in the event database(s) of FIG. 8.

FIG. 10 shows a data structure 1000 for recording events according to the present invention. Data structure 1000 includes an Events table 1002, a File Systems table 1004, and a Renames table 1006. The tables 1002, 1004, and 1006 are filled depending on the events that are determined or detected.

Each record in Events table 1002 includes an Event ID field 1010, a Canonical Path field 1012, a New Path field 1014, a Total Versions field 1016, a Path Type field 1018, an Event Type field 1020, a Timestamp field 1022, a User ID field 1024, a Lstmtime field 1026, a Size field 1028, a Universal ID field 1030, a valid field 1032, and an Other field 1034. A record is created in Events table 1002 for each event that occurs in an associated file system other than rename events. For rename events (file or folder), two event records 1002 are created: one from the source path perspective and one from the destination path perspective.

Event ID 1010 is a key field of events table 1002 and includes data uniquely identifying the event record 1002. Canonical Path field 1012 includes data indicating a standardized path of the file system object on which the event occurred. For RENAME events, canonical path field 1012 for the source event record will include the source path, whereas field 1012 will include the destination path for the destination event record. Thus, path information can be accessed from both source and destination path perspectives. New Path field 1014 includes data indicating a new path assigned to the file system object when an event occurred. UQID field 1016 indicates how many versions of an associated file system object are kept in RFS 202. Path Type field 1018 includes data (e.g., a flag) indicating if the event record is associated with a file or a folder. Event Type field 1020 includes data indicating the type of event (e.g., CREATE, UPDATE, UNLINK, RENAME_SRC_FILE, RENAME_DST_FILE, MKDIR, RMDIR, RENAME_SRC_DIR, RENAME_DST_DIR, etc.) that the event record is associated with. Timestamp field 1022 includes data indicating when the event occurred. User ID field 1024 includes data identifying the user that caused the event. Lstmtime field 1026 includes data indicating the time when the event on the associated file system object was completed (the last time the file system object was modified). Size field 1028 includes data indicating the size of the file system object associated with the event. Size field 1028 can optionally be set to zero (0) when the associated file system object is a folder. Universal ID field 1030 includes data uniquely identifying the file system object. The identifier can be used, for example, to identify the same file system objects on different file systems (e.g., RFS 202 and LFS 204) and/or associate a virtual file system object (e.g., in metadata database 606) with the data file in the data store (e.g., in client data store 522). Valid field 1032 includes data (e.g., a flag) indicating whether or not an event is valid or invalid. Valid field 1032 can be set by default to indicate that the associated event is valid when the event record is created. Then, if the event is later invalidated during event processing, the valid field 1032 can be set to an alternative value to indicate its invalid status. Other field 1034 includes other data that might be useful during event processing (e.g., error information, reduction status, feedback, etc.).

Each record in File Systems table 1004 includes a File System (FS) ID field 1040, a Canonical Path field 1042, a Child Name field 1044, a Parent Path field 1046, a Parent Depth field 1048, a Path Type field 1050, a Total Versions field 1052, a Lstmtime field 1054, a Size field 1056, a Checksum field 1058, and a Universal ID field 1060. A record is created in File Systems table 1004 for each path associated with an event. Accordingly, there is a many-to-one relationship between records in Events table 1002 and records in File Systems table 1004, such that many events can happen on one file system path. Storing the file system paths on which events occurred facilitates event processing.

File System (FS) ID field 1040 is the key field of File Systems table 1004 and includes data uniquely identifying the file systems record. Canonical Path field 1042, Path Type field 1050, Total Versions field 1052, Lstmtime field 1054, Size field 1056, and Universal ID field 1060 include data as described above for Canonical Path field 1012, Path Type field 1018, Total Versions field 1016, Lstmtime field 1026, Size field 1028, and Universal ID field 1030 respectively, of Events table 1002. Child Name field 1044 includes data representing the name of a child file system object to the path contained in Canonical Path field 1042. Parent Path field 1046 includes data representing the parent path of the path represented in Canonical Path 1042. Parent Depth field 1048 includes data indicating the depth of the path stored in Parent Path field 1046. Checksum field 1058 includes a checksum (e.g., Sha512, etc.) for the file system object, which can be used for comparison during synchronization of files.

Records are stored in Renames table 1006 for all rename events. Rename events encompass both rename events and move events on file system objects. Each record in Renames table 1006 includes a Rename ID field 1070, a Source Event ID field 1072, and a Destination Event ID field 1074. There is a two-to-one relationship between records in Events table 1002 and records in Renames table 1006. Thus, two event records in Events table 1002 (source and destination) are associated with each record in Renames table 1006.

Rename ID field 1070 is the key field of Renames table 1006 and includes data uniquely identifying each rename record. Source Event ID field 1072 contains data representing an Event ID identifying the source event record for the rename event. The source event record provides a record of the rename event from the perspective of the source path of the file or directory. Destination Event ID field 1074 contains data representing an Event ID identifying the destination event record for the rename event. The destination event record provides a record of the rename event from the perspective of the destination path of the file or directory.

Data structure 1000 can be used to store records of SSS events 214 and 216 in any of databases 812, 814, 820, and 822 (FIG. 8). Data structure 1000 can also be used to store records of RS events 210 and 212 in databases 830 and 832. In such a case, data structure 1000 might not include Renames table 1006 because, as indicated above, renames appear as a DELETE and CREATE event combination in snapshot-based synchronizations. Additionally, data structure 1000 is intended to be exemplary in nature, and data structure 1000 can, therefore, include additional or fewer fields according to the particular system and types of events.

Figure 11:
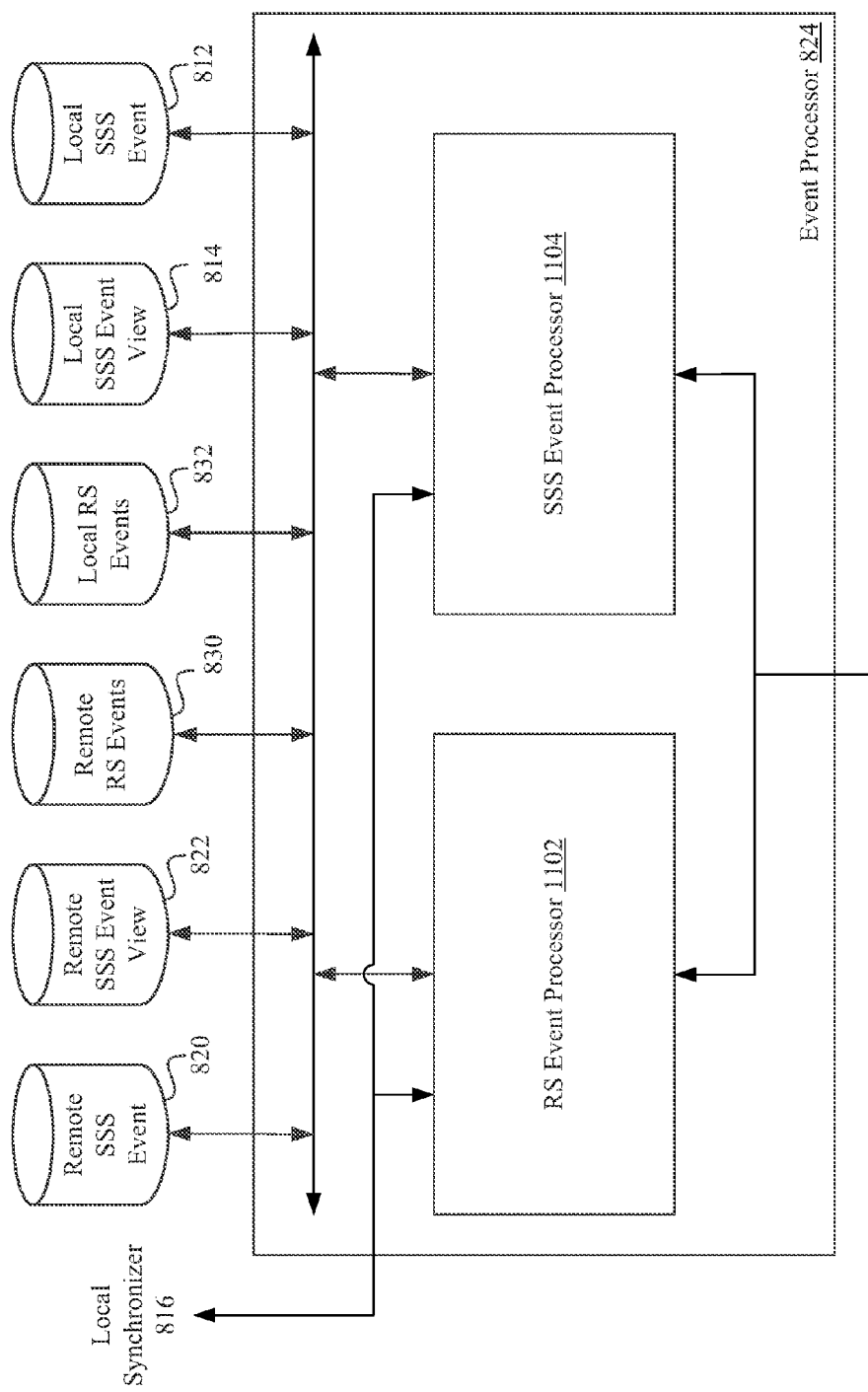
FIG. 11 is a relational block diagram showing the functional elements of the event processor of FIG. 8 in greater detail.

FIG. 11 is a relational diagram showing the functional elements of event processor 824 of FIG. 8 in greater detail. In particular, event processor 824 includes an RS event processor 1102 and a SSS event processor 1104. RS event processor 1102 processes remote and local RS events 210 and 212 to generate file system operations associated with the snapshot-based synchronizations (e.g., FFS, FRS, and LRS). Additionally, for FRS and LRS, RS event processor 1102 performs validation of selected ones of the remote and local RS events 210 and 212 and fences any invalidated RS events 414 and 416 that would result in improper deletions of file system objects in either RFS 202 or LFS 204. Accordingly, RS event processor 1102 has access to the RS and SSS events stored in any of databases 812, 814, 820, 822, 830, and 832 in carrying out its functions. Finally, RS event processor 1102 communicates with local synchronizer 816 regarding the snapshot-based synchronizations as discussed herein.

SSS event processor 1104 processes the remote and local SSS events 214 and 216 stored in event view databases 822 and 814, respectively, to generate file system operations associated with a steady state synchronization routine. SSS event processor 1104 also communicates with local synchronizer 816 regarding such steady state synchronizations as discussed herein, for example, to receive instructions to begin SSS event processing, to report errors, and/or to request a rescan synchronization, etc. File system operations generated by RS event processor 1102 and SSS event processor 1104 are output to sync action handler 826.

Figure 12A:
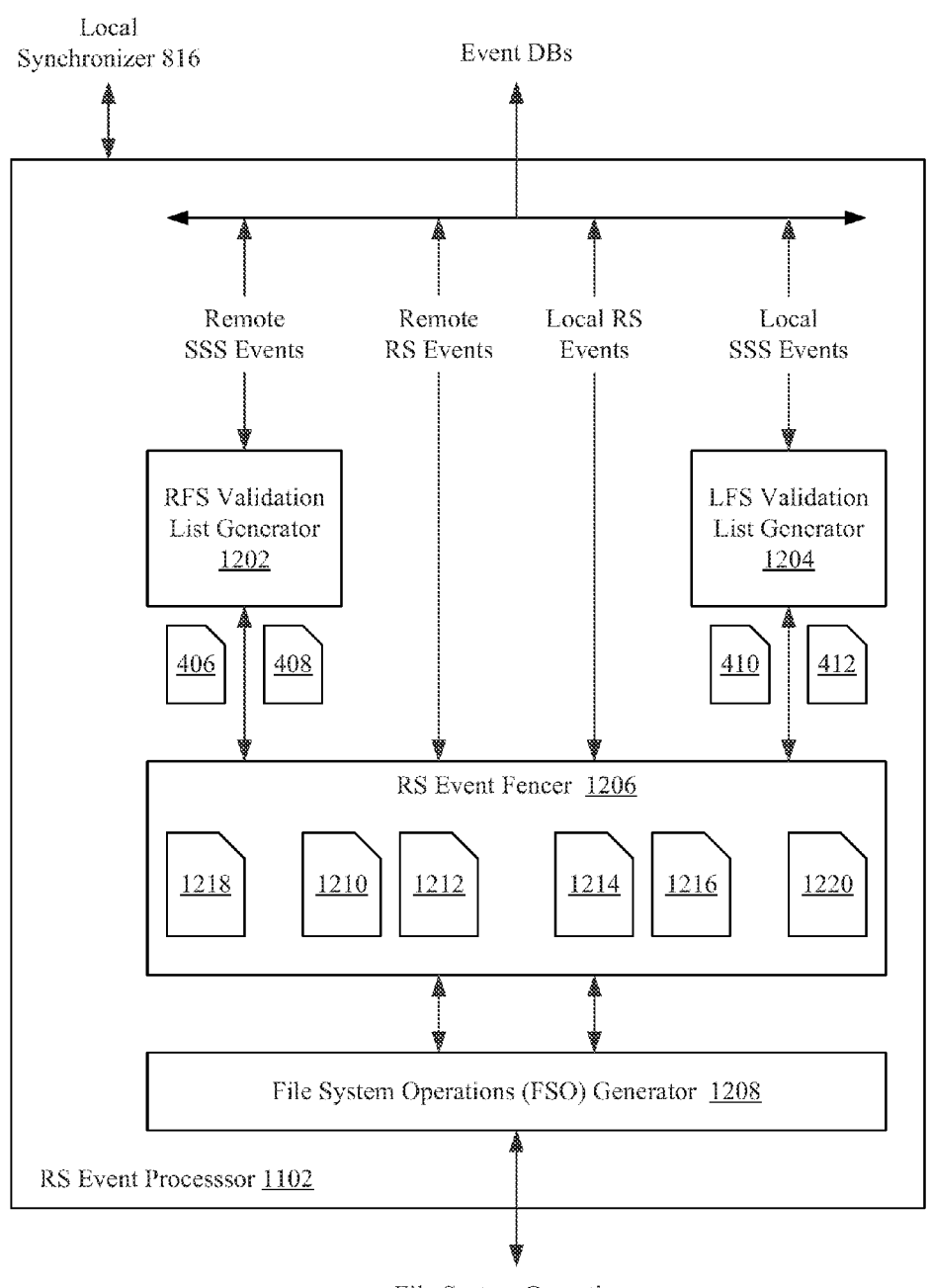
FIG. 12A is a relational block diagram showing the functional elements of the RS processor of FIG. 11 in greater detail.

FIG. 12A is a relational diagram showing the functional elements of RS event processor 1102 of event processor 824 in greater detail. RS event processor 1102 includes an RFS validation list generator 1202, an LFS validation list generator 1204, an RS event fencer 1206, and a file system operations (FSO) generator 1208. The elements of RS event processor 1102 facilitate snapshot-based synchronizations by performing RS event processing.

RFS validation list generator 1202 and LFS validation list generator 1204 build the delete validation lists discussed herein at the beginning of each FRS or LRS. RFS validation list generator 1202 accesses remote SSS events 214 stored in remote SSS event database 820 and/or remote SSS event view database 822 and generates RFS UNLINK validation list 406 and RFS RMDIR validation list 408 therefrom as described above in FIG. 4. More particularly, RFS validation list generator 1202 uses the remote SSS events 214 to generate RFS UNLINK validation list 406, by including in it the paths (e.g., canonical path 1012 from the event record) of each file in RFS 202 that was deleted or renamed as indicated by the remote SSS events 214. (For a rename event, the source event path is used for building the validation list.) RFS validation list generator 1202 also uses the remote SSS events 214 to generate RFS RMDIR validation list 408, which includes the paths of each folder in RFS 202 that was either deleted or renamed as indicated by the remote SSS events 214. (Again, for a rename event, the source event path is used for building the validation list.) Similarly, LFS validation list generator 1204 accesses local SSS events 216 stored in local SSS event database 812 and/or remote SSS event view database 814 and generates LFS UNLINK validation list 410 and LFS RMDIR validation list 412 therefrom as described above in FIG. 4. RFS validation list generator 1202 and LFS validation list generator 1204 can optionally be disabled during an FFS because LVS database 209 would not yet have entries.

The RFS validation lists 406 and 408 and the LFS validation lists 410 and 412 can be in any convenient format that can be efficiently searched. For example, tabular, flat file, or comma separated value formats can be used. Additionally, these lists are stored in LFS 204 and/or in working memory 706.

RS event fencer 1206 is operative to receive the RFS UNLINK and RMDIR validations lists 406 and 408 from RFS validation list generator 1202 and the LFS UNLINK AND RMDIR validation lists 410 and 412 from LFS validation list generator 1204. RS event fencer 1206 also accesses remote RS events 210 in remote RS events database 830 and local RS events 212 in local RS events database 832.

RS event fencer 1206 validates selected ones of remote RS events 210 and local RS events 212 for each FRS and LRS that is performed. In particular, RS event fencer 1206 accesses the remote RS events 210 stored in remote RS events database 830 and validates the paths (e.g., canonical paths) of selected ones of the remote RS events 210 stored therein against the paths in RFS validations lists 406 and 408 generated by RFS validation list generator 1202. The remote RS events 210 selected for validation are those remote RS events 210 that would cause a file system object to be deleted in LFS 204 should file system operations be generated based on that remote RS event 210 and applied to LFS 204. Here, the remote RFS events 210 selected for validation are delete (UNLINK) file and delete folder (RMDIR) events. For each remote RS event 210 selected for validation, RS event fencer 1206 confirms that the path of the deleted object in the remote RS event (e.g., the canonical path in canonical path 1012 from the remote RS event record) has a corresponding path in one of the validation lists 406 and 408 generated by RFS validation list generator 1202. If so, then the remote RS event 210 is validated and passed to FSO generator 1208 so that file system operations can be generated to apply that RS event 210 to LFS 204. However, if RS event fencer 1206 determines that a path of the deleted object of the remote RS event 210 is not present in RFS UNLINK validation list 406 (for file deletes) or in RFS RMDIR validation list 408 (for folder deletes), then RS event fencer 1206 fences that remote RS event 210 so that file system operations are not generated based on it.

There are several ways that RS event fencer 1206 can fence an invalidated remote RS event 210. For example, RS event fencer 1206 can simply ignore the record of invalidated remote RS event 210 without passing it to file system operations generator 1008 or by setting a flag (e.g., valid flag 1032) to indicate the remote RS event 210 is invalid. Additionally or alternatively, RS event fencer 1206 can delete the invalidated remote RS event 210 from remote RS events database 830. As still another example, if in an alternative embodiment file system operations are generated based on the remote RS event 210 before the remote RS event 210 is invalidated, then RS event fencer 1206 could delete or trap the associated file system operations so they are not applied to LFS 204.

In addition to the remote RS events 210 that were selected for validation and found to be valid, RS event fencer 1206 also passes the other remote RS events 210 to file system operations generator 1208. These other remote RS events 210 correspond to those generated for a particular snapshot-based synchronization but that do not risk incorrectly deleting a file system object in LFS 204. For example, such other remote RS events 210 might be associated with a file or folder being created in RFS 202.

The delete fencing process has now been described for validating selected ones of the remote RS events 210. The validation and delete fencing process is substantially the same for the local RS events 212 associated with changes to LFS 204. In particular, RS event fencer 1206 accesses records of the local RS events 212 stored in local RS events database 832 and validates selected ones of the local RS events 212 against the LFS UNLINK and RMDIR validations lists 410 and 412. As above, the local RS events 212 selected for validation are local RS events 212 (e.g., delete file and delete folder events) that could cause a file system object to be incorrectly deleted in RFS 202 should file system operations be generated based on that local RS event 212 and applied to RFS 202. For each local RS event 212 selected for validation, RS event fencer 1206 confirms that the path of the deleted object associated with the local RS event 214 (e.g., the canonical path in canonical path 1012 from the remote RS event record) has a corresponding path in one of LFS UNLINK and RMDIR validation lists 410 and 412 generated by LFS validation list generator 1204. If so, then the local RS event 212 is validated and passed to FSO generator 1208 so that file system operations can be generated to apply that local RS event 212 to RFS 202. Otherwise, the local RS event 212 is invalidated and fenced (e.g., flagged, deleted, ignored, etc.) such that file system operations are not applied to RFS 202 based upon the invalidated event.

Optionally, RS event fencer 1206 can build one or more RS event lists for each rescan synchronization based on the remote RS events 210 and local RS events 212. For example, RS event fencer 1206 can build an RS UNLINK event list 1210 and an RS RMDIR event list 1210 based on the remote RS events 210 contained in remote RS events database 830. RS UNLINK event list 1210 would include event paths (e.g., canonical paths 1012 for each selected remote RS event record) for each of the delete file (UNLINK) remote RS events 210, whereas RS RMDIR event list 1212 would include event paths for each of the delete folder (RMDIR) remote RS events 210. Similarly, RS event fencer 1206 can build an RS UNLINK event list 1214 and an RS RMDIR event list 1216 based on the delete file (UNLINK) local RS events 212 and the delete folder (RMDIR) local RS events 212 in local RS events database 832, respectively. The RS events that are included in lists 1210-1216 are those that are selected for validation.

Subsequently, to perform validation, RS event fencer 1206 would compare the entries in RS UNLINK event list 1210 and RS RMDIR event list 1212 with the entries in RFS UNLINK validation list 406 and RFS RMDIR validation list 408, respectively. RS event fencer 1206 would then fence any event that is in one of RS events lists 1210 and 1212 and not in the corresponding one of validation lists 406 and 408. Similarly, RS event fencer 1206 would also compare the entries in RS UNLINK event list 1214 and RS RMDIR event list 1216 with the entries in LFS UNLINK validation list 410 and LFS RMDIR validation list 412, respectively, and then fence any local RS event 212 that was in one of RS event lists 1214 and 1216 and not in the corresponding one of validation lists 410 and 412.

RS event lists 1210, 1212, 1214, and 1216 help to improve the efficiency of the validation process by consolidating all RS events that need to be validated into a plurality of lists. As yet another option, only one RS event list can be used to store all remote RS events 210 and another RS event list can be used to store all local RS events 212 that need to be validated. Similarly, the RFS validation lists 406 and 408 can be combined into a single list, as can the LFS validation lists 410 and 412.

As yet another option, RS event fencer 1206 can also prepare a remote fenced event list 1218 and a local fenced event list 1220, which contain the fenced remote and local RS events respectively, for error reporting purposes. These fenced event lists 1218 and 1220 could also be used to take remedial actions, such as correcting or removing spurious entries in LVS database 209.

FSO generator 1208 receives the remote and local RS events 210 and 212 and generates file system operations based on the received RS events, excluding the invalidated ones of the local and remote RS events 210 and 212. FSO generator 1208 then outputs the generated file system operations to sync actions handler 826 for application to the appropriate ones of RFS 202 and LFS 204 to carry out the snapshot-based synchronization. In the case that FS generator 1208 receives all RS events from RS event fencer 1206, FSO generator 1208 is operative to ignore the RS events that have been invalidated (e.g., based on valid field 1032).

The file system operations available to be output by RS event processor 1102 will be determined by the application interfaces and file system protocols being employed. Such file system operations can include, but are not limited to, pushing (uploading) and pulling (downloading) files to facilitate their creation and updates, making folders, deleting files and folders, restoring files from the trash, and any other desirable actions. Additionally, there might be different iterations of the same file system operations, which distinguish their applicability to RFS 202 and the other to LFS 204. As yet another example, pulling a file to LFS 204 might also result in a prior version of the file being pushed to RFS 202 so that the prior version can be stored in remote cloud server 102 to facilitate versioning. Still further, such file system operations can also include operations to cause LVS database 209 to be updated (e.g., by removing, adding, or updating a path), etc.

As an example, consider a remote RS event 210, CREATE "/Shared/abc.txt", which is associated with "/Shared/abc.txt" being created in RFS 202. To synchronize this operation, FSO generator 1208 would generate file system operation(s) to pull "/Shared/abc.txt" to local cloud server 104, to store the file (both data and metadata) in LFS 204, and optionally to update LVS database 209 to reflect the synchronized file (e.g., if sync actions handler 826 required specific instructions to do so). If LFS 204 already included a file "/Shared/abc.txt" (in the case of an update), FSO generator 1208 might also generate file system operations to push the older file "/Shared/abc.txt" in LFS 204 to CFS 204 (as a prior version), and then update LVS database 209 accordingly. Where versioning is employed in RFS 202, the prior versions of file "/Shared/abc.txt" in RFS 202 could be recovered if needed. As another example, consider a local RS event 212, UNLINK "/Shared/bcd.txt", which is associated with "/Shared/bcd.txt" being deleted from LFS 204. To synchronize this operation, FSO generator 1208 would generate file system operation(s) to delete "/Shared/bcd.txt" from LFS 204 and optionally to remove the path from LVS database 209.

The snapshot-based synchronization processes described in FIG. 12A can also communicate with local synchronizer 818 as desirable. For example, RS event processor 1102 can begin RS event processing responsive to a command from local synchronizer 818. RS event processor 1102 can also communicate with local synchronizer 818 about the status of a snapshot-based synchronization and/or notify local synchronizer 818 about invalidated ones of RS events 210 and 212 such as by providing fenced RS event lists 1214 and 1216.

It should also be noted that generating and staging remote and local RS events 210 and 212 in databases 830 and 832 provides particular advantages. For example, this staging enables the selected RS events to be validated quickly once the RFS and LFS validation lists 406, 408, 410, and 412 are built. Staging the events also enables the option for RS event fencer 1206 to build the RS event validation lists 1210, 1212, 1214, and 1216. Moreover, RS events can be fenced before file system operations are generated by FSO generator 1208, thereby conserving these resources.

Despite these advantages, in an alternative embodiment, RS events 210 and 212 could be generated by local synchronizer 816 and fed directly to RS event fencer 1206. As still another alternative, local synchronizer 816 could generate file system operations directly, optionally without generating RS event records, and provide those file system operations to RS event fencer 1206. RS event fencer 1206 could then fence any delete operations that were incorrectly generated, for example, by validating delete operations to be applied to LFS 204 against RFS validation lists 406 and 408 and by validating delete operations to be applied to RFS 202 against LFS validation lists 410 and 412. Additionally, FSO generator 1208 would be unnecessary if local synchronizer 816 were generating file system operations directly from the comparison of RFS snapshot 206, LFS snapshot 208, and LVS database 209. These and other modifications and alternative embodiments will be apparent in view of this disclosure.

As mentioned above, RS event fencer 406 provides RS event validation and delete fencing FRS and LRS routines. However, RS event fencer 1206 will normally pass all RS events to FSO generator 1208 during an FFS because it is the initial synchronization. However, delete fencing could be used to protect against improper deletes in other scenarios, such as an FFS, if it is advantageous to do so.

The delete fencing provided by the invention has several applications and advantages. First, delete fencing fences RS deletes caused by incorrect entries in the LVS database 209. The delete fencing mechanism safeguards against deleting data in RFS 202 and LFS 204 during an FRS or LRS whenever there is an incorrect entry in LVS database 209.

Second, the invention facilitates fencing RS deletes that are caused by someone deleting objects in LFS 204 outside the portal provided by LFS handler 802 and local VFS module 804, for example, by an outside user 840 accessing LFS 204 over Secure Shell (SSH). Assume, for example, that the RFS 202 and LFS 204 have been synchronized and LVS database 209 was updated accordingly. If outside user 840 now accesses LFS 204 over SSH and deletes files and folders, then those deletes would not be captured as local SSS events 216 by local VFS module 804 and would not be removed from RFS 202 during steady state synchronization. However if an FRS or LRS is later performed, the items deleted over SSH would cause local RS events to be generated and the corresponding items in RFS 202 to be deleted if delete fencing were not employed. Thus, delete fencing ensures that synchronized file system objects that are deleted from LFS 204 outside the portal provided by LFS handler 802 and local VFS module 804 are not removed from the RFS 202 when a rescan synchronization is performed.

In other words, delete fencing modifies the RS semantics to be similar to that of the SSS for file system objects that were removed from LFS 204 over SSH. In particular, the system does not sync these deletes and remove the corresponding objects from RFS 202, regardless of whether an RS or an SSS is performed. This aligns the RS and SSS behaviors when file system objects are being removed from LFS 204 over SSH or outside the access portal provided by LFS handler 802 and VFS module 804.

Utilizing LVS database 209 and delete fencing provides another advantage in that it aligns RS and SSS semantics after two-way synchronization has been activated (e.g., based on client configuration preferences) from one-way synchronization. Assume that the one-way synchronization direction was from RFS 202 to LFS 204, which means that RFS 202 changes were being propagated to LFS 204, but not vice versa. If entries in LVS database 209 are not made for objects in portions of a file system subject to one-way synchronization, and two-way synchronization was then enabled, two different outcomes could occur depending on the next synchronization process that is performed. For example, if the next synchronization is an FRS, then any object in LFS 204 that was created while one-way synchronization was enabled (and therefore not synchronized with RFS 202) would be pushed to/created in RFS 202 during the FRS. Alternatively, if the next synchronization is an SSS, then any objects that are only in LFS 204 would not be created to RFS 202, because no SSS events would exist for those objects due to the prior one-way synchronization. Thus, following a one-way to two-way synchronization switch, different results occur based on which type of synchronization process occurs next.

Accordingly, filling LVS database 209 with entries for paths of a file system that are subject to one-way synchronization and employing delete fencing causes either a subsequent FRS or SSS to yield the same result. For example, assume that while one-way synchronization was still active, the file system objects "/Shared/M/", "/Shared/N/" and "/Shared/N/z.txt" were created in LFS 204 and were reflected in LVS database 209. After bi-directional synchronization is initiated, a rescan synchronization would result in a comparison like the one shown in table 1250 in FIG. 12B. Accordingly, without delete fencing and the entries in LVS database 209, the specified RS events and delete operations would be generated for the file system objects and they would be deleted from LFS 204. However, with the delete fencing mechanism, these delete RS events are fenced and the file system objects are preserved, just like they would be in an SSS.

Figure 13:
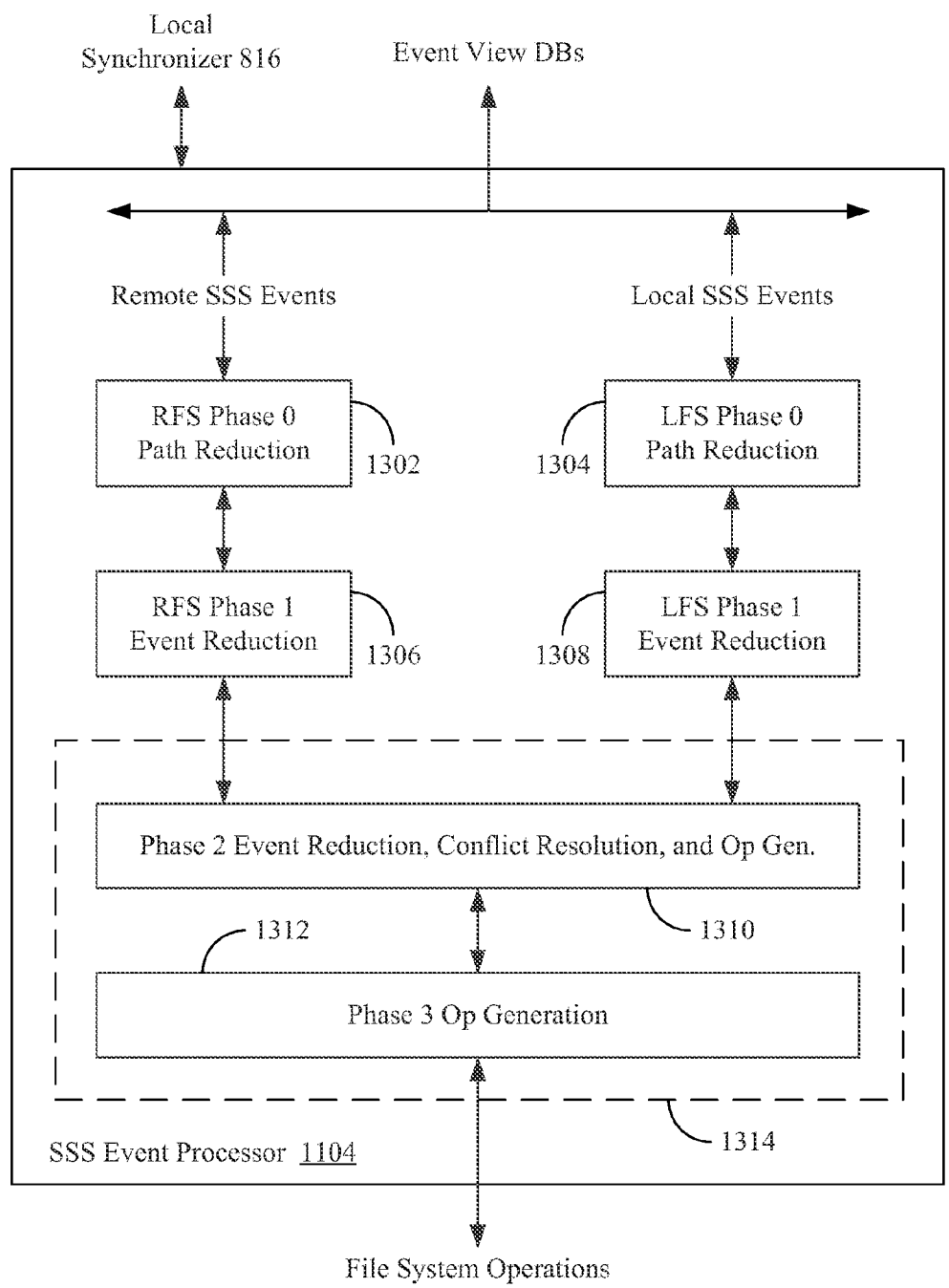
FIG. 13 is a relational block diagram showing the functional aspects of the SSS processor of FIG. 11 in greater detail.

FIG. 13 is a block diagram showing the functional aspects of SSS event processor 1104 (FIG. 11) of Event processor 824 in greater detail. SSS event processor 1104 includes a series of processes (Phase 0 to Phase 3) that reduce, modify, and coalesce the remote and local SSS events 214 and 216 stored in remote SSS event view database 822 and local SSS event view database 814 (FIG. 8). The processed set of LFS and RFS SSS events are used to generate file system operations that can be applied to RFS 202 and LFS 204 to synchronize RFS 202 and LFS 204 as of the end of the associated event synchronization period. SSS event processor 1104 includes an RFS phase 0 module 1302, an LFS phase 0 module 1304, an RFS phase 1 module 1306, and an LFS phase 1 module 1308. SSS event processor 1104 also includes a phase 2 module 1310 and a phase 3 module 1312.

RFS phase 0 module 1302 receives remote SSS events 214 from remote SSS event view database 822. In one embodiment, the remote SSS events 214 are defined by the information (e.g., remote event records 1002, file system records 1004, and rename records 1006) of remote SSS event view database 822. RFS phase 0 module 1302 performs various path reduction and modification processes on the remote SSS events 214 and provides them to RFS Phase 1 module 1306. RFS Phase 1 module 1306 receives the remote SSS events 214, as modified by phase 0 module 1302, and performs further reduction of the remote SSS events, for example, by utilizing a set of look-up tables.

LFS phase 0 module 1304 and LFS phase 1 module 1308 operate substantially the same way on the local SSS events 216 (e.g., as defined by the local event records 1002, file system records 1004, and rename records 1006) as received from local SSS event view database 814. LFS phase 0 module 1304 performs various path reduction and modification processes on the local SSS events 216, and subsequently, LFS Phase 1 module 1308 receives the modified local SSS events and performs further local SSS event reduction.

The phase 0 and phase 1 processes are performed on local SSS events and remote SSS events independently. The RFS and LFS phase 0 and phase 1 processes are, therefore, shown separately for clarity, but these modules can be combined into single phase 0 and phase 1 modules if desired, as long as the local and remote SSS event streams are processed independently of each other during phase 0 and phase 1.

The modified local and remote event streams from RFS phase 1 module 1306 and LFS phase 1 module 1308 are then combined and processed further by phase 2 module 1310. Phase 2 module 1310 reduces the number of remote SSS events and local SSS events even further, if possible. Additionally, phase 2 module 1310 compares local and remote SSS events that occur on common file system object paths in LFS 204 and RFS 202 and resolves such conflicts (if any) between the local and remote SSS events. In a particular embodiment, phase 2 module 1310 utilizes a series of lookup tables and APIs to resolve LFS-RFS SSS event conflicts. As part of its process, phase 2 module 1310 generates file system operations that, when applied to RFS 202 and/or LFS 204, implement the conflict resolution.

Phase 3 module 1312 is utilized to generate file system operations based on the remaining local and remote SSS events as discussed in more detail below. Because phase 2 module 1310 and phase 3 module 1312 both generate file system operations to be applied to RFS 202 and LFS 204, modules 1310 and 1312 can also be perceived as a single module 1314 and their respective functions can be implemented in combination.

Phase 0 event processing will now be described in greater detail. Phase 0 processing is based on the types of SSS events that are received. In particular, files and/or folders on paths affected by RENAME and RMDIR events are subject to modification by Phase 0 processing. Phase 0 event processing (1) adjusts path prefixes relevant to folder and file renames, and (2) removes events that happened within a deleted folder as these events are no longer relevant.

Phase 0 path modification is carried out on SSS events that happened on a path that was changed (renamed) at some time. The SSS events whose paths are being modified will have a temporal precedence with regard to the rename event that necessitated the path modifications. Usually, the events being modified are those that occurred on the path prior to the rename event. Events that happened after the rename event generally remain unchanged. The following are examples of phase 0 path modifications for rename events:

(1) UPDATE/A/b.txt+RENAME/A to /B=RENAME/A to /B+UPDATE/B/b.txt (2) RENAME/AB/c.txt to /A/B/C/d.txt+RENAME/A to /X=RENAME/A to /X+RENAME/X/B/c.txt to /X/B/C/d.txt In example (1), two SSS events previously made to one file system (e.g., RFS 202) are shown on the left hand side (LHS) of the equation, and two modified SSS events are shown on the right hand side (RHS) of the equation. On the LHS, an update event is followed by a rename event. Phase 0 module 1302 modifies the LHS events by moving the rename event ahead of the update event on the RHS, for example by modifying timestamp field 1022 in the event records 1002 associated with the SSS events. Phase 0 module 1302 also modifies the path field 1012 in the UPDATE event to reflect the new path. Thus, if the SSS events on the RHS of example (1) were applied to a second file system (e.g., LFS 204), the second file system would be synchronized with the first file system.

In example (2), the two SSS events on the LHS have been made to a first file system. In particular, a file "c.txt" has been renamed to "d.txt" and moved to a new directory by the first RENAME event. Note that the file RENAME event accomplishes both the rename and move tasks. The second RENAME changes the name of folder /A to /X. Phase 0 module 1302 modifies these events by chronologically moving the folder RENAME event ahead of the file RENAME event. Phase 0 module also modifies the paths for the file rename event records to reflect the prior folder RENAME event. Thus, if the events on the RHS of example (2) were applied to a second file system, the second file system would be synchronized with the first file system.

The following is exemplary pseudo-code for a phase 0 path modification algorithm.

```
for each rename_event in all RENAME events:
    reduce_timestamp = timestamp(rename_event)
    next_timestamp = reduce_timestamp + 1
    reduce_path = src_path(rename_event)
    translate_path = dst_path(rename_event)
    for event in all events sorted by timestamp:
        if event is DIR event: continue
        if event is UNLINK event: continue
        if event does NOT start with reduce_path: continue
        if timestamp(event) > reduce_timestamp: break
        if rename_event is a FILE event:
            if event is not a CREATE or UPDATE event: continue
            if path(event) != reduce_path: continue
        event.replace(reduce_path with translate_path)
        event.timestamp = next_timestamp
```

Phase 0 module 1302 performs the above algorithm for each rename SSS event record in Renames table 1006 (line 1). The algorithm determines when the rename event occurred and defines a subsequent time. The algorithm also determines the source path (e.g., /A in example 1) and the destination path (e.g., /B in example 1). Then, via the nested FOR loop, phase 0 module 1302 checks all the event records in table 1002 in chronological order. Module 1302 determines the ones of the other event records containing the source path, and modifies those records that occurred before the rename event with the destination path. The algorithm also modifies the timestamps of those events such that they occur after the rename event.

Phase 0 module 1302 also checks for remove directory (RMDIR) SSS events and deletes events that are no longer relevant in view of the RMDIR event. An example of this process is shown below:

(1) CREATE/A/a.txt+MKDIR/AB+CREATE/A/B/c.txt+RMDIR/A=RMDIR/A

On the LHS of the example, three SSS events occur on folder /A and then folder /A is deleted in a first file system (e.g., RFS 202). Accordingly, phase 0 module 1302 deletes the three events occurring before the RMDIR /A event. Thus, the only remaining event on the RHS is RMDIR /A. When RMDIR /A is applied to a second file system (e.g., LFS 204), the first and second file systems will be synchronized without a folder /A. The following is pseudo-code for implementing this event reduction:

```
for rmdir_event in all events:
    rmdir_path = path(rmdir_event)
    rmdir_timestamp = timestamp(rmdir_event)
    for event in all events sorted by timestamp:
        if timestamp(event) > rmdir_timestamp: break
        if path(event) starts with rmdir_path: remove(event)
```

The above algorithm searches the event records in table 1002 and returns each RMDIR SSS event. For each RMDIR event, the algorithm determines the removed folder and the timestamp for the RMDIR event. Then, the algorithm searches through all events in table 1002 for the particular folder by timestamp. If the event's timestamp is later than the timestamp of the RMDIR event, then the event record is left alone. However, if the event's timestamp is before that of the RMDIR event and if the event's path field 912 starts with or is a child of the deleted folder, then the event is removed.

Based on the above processes, RFS phase 0 module 1302 modifies paths and reduces remote SSS events. LFS Phase 0 module 1304 modifies paths and reduces local events in substantially the same manner, as indicated previously.

Following phase 0 modification and reduction, RFS phase 1 module 1306 performs event reduction and modification on redundant remote SSS events (as modified in phase 0). Phase 1 event processing reduces consecutive and redundant SSS events that happened on the same file system object path. The following are some examples:
(1) CREATE a.txt+UPDATE a.txt+UPDATE a.txt=CREATE a.txt.
(2) CREATE /A/a.txt+UNLINK /A/a.txt=NONE
(3) RENAME /A to /B+RENAME /B to /C=RENAME /A to /C
(4) RENAME /A to /B+RMDIR /B=RMDIR /A In example (1), the common file system object is a.txt. On the LHS, a.txt is created and then updated twice. RFS phase 1 module 1306 compresses these three events to one CREATE event on the RHS. In other words, the update events are deleted. This CREATE event will cause a.txt, in its most recent form, to be created on LFS 204.

In example (2), the common file system object is a.txt. On the LHS, a.txt is created and then deleted. Therefore, no action needs to be taken on the RHS (e.g., at the LFS 204), and RFS phase 1 module 1306 deletes the CREATE and UNLINK events.

In example (3), the common file system object is folder B. On the LHS, folder /A is renamed to folder /B and then folder /B is renamed to folder /C. RFS phase 1 module 1306 reduces these two events to a RENAME event from folder /A to folder /C. The intermediate rename event to folder /B can be eliminated. Folder /A will be renamed to folder /C on LFS 204.

In example (4), the common file system object is folder B. On the LHS, folder /A is renamed to folder B. Then, folder /B is deleted. RFS phase 1 module 1306 reduces these two events to RMDIR /A on the RHS. When RMDIR /A is applied to LFS 204, folder /A will be removed from LFS 204.

RFS phase 1 module 1306 operates as follows. When phase 1 reduction begins, RFS phase 1 module 1306 loops through the file system paths (e.g., from file systems table 1004) for the remote SSS events being processed. For each file system path, phase 1 module 1306 retrieves the associated event records 1002 that occurred on that path and analyzes them in chronological order according to timestamp (timestamp field 1022). For each two consecutive events, RFS phase 1 module 1306 determines the appropriate event reduction and modifies the event records accordingly. Thus, the number of event records can decrease as phase 1 processing progresses. Each reduced remote SSS event record can then be used for a next event reduction determination on that file system path. Once all event reductions for events on a particular path are complete, RFS phase 1 module 1306 moves to the next file system path in table 1004 and repeats the reduction process. When all file system paths have been processed, phase 1 reduction is complete.

The following is exemplary pseudo-code that implements phase 1 reduction.

```
reduce_events_for_path(event_list):
    path_list_to_reduce_events = empty_list
    for event in event_list:
        nreduced_events, path_list = reduce_two_events(event,
            event.next)
        if path_list: path_list_to_reduce_events.extend(path_list)
    return path_list_to_reduce_events
reduce_events(path_list):
    for path in all paths for which there are events:
        path_list_to_reduce_events =
            reduce_events_for_path(event_list(path))
    path_list = reduce_events(all_paths)
``` while path_list is NOT empty:
    path_list = reduce_events(path_list)

LFS phase 1 module 1308 operates substantially the same as RFS phase 1 module 1306, except that it operates on the local SSS events as previously modified by phase 0 module 1304. Optionally, RFS and LFS phase 1 modules 1306 and 1308 can be combined into a single module that performs phase 1 reduction, independently, on the remote events and the local events.

Phase 1 event reductions are described in more detail with reference to FIGS. 10A-10D of U.S. Publication Nos. 2014/0040196 A1 and 2014/0040197 A1 (referenced above), which are incorporated by reference herein in their entireties.

After phase 0 and phase 1 processing, the remote and local SSS events are merged and processed jointly by the phase 2 module 1310 according to file system object path. The phase 2 module 1310 reduces remote and local SSS events associated with the same file system object, resolves conflicts between the local and remote SSS events on the same file system object, and generates file system operations according to the conflict resolution.

The phase 2 module 1310 reduces local and remote SSS events in the following three cases:
(1) LFS MKDIR A+RFS MKDIR A=NONE
(2) LFS RMDIR A+RFS RMDIR A=NONE
(3) LFS UNLINK A+RFS UNLINK A=NONE In each of these three cases, the same folder is made or deleted, or the same file is deleted, on both the LFS 204 and the RFS 202. Therefore, phase 2 module 1310 is able to remove these events.

Phase 2 module 1310 has another important function in that it resolves conflicts between local and remote SSS events that happen on a common file system object. A conflict happens when file system operations on any specific path do not leave the event stream in a consistent state. To resolve these conflicts, phase 2 module 1310 utilizes conflict resolution look-up tables to determine the appropriate action. The tables for conflict resolution are described in detail with reference to FIGS. 11A-11D of U.S. Publication Nos. 2014/0040196 A1 and 2014/0040197 A1 (referenced above), which are incorporated by reference herein in their entireties.

Phase 3 module 1312 generates file system operations based on the processed remote and local SSS events, including based on any changes produced by the phase 0-2 modules. The phase 3 module 1312 also integrates (e.g., chronologically, etc.) the file system operations generated by phase 2 module 1310 during conflict resolution into the file system operations that it will output. Phase 3 module 1312 then outputs a file system operation stream, including operations that it generated and operations that phase 2 module 1310 generated, to sync actions handler 826.

To generate file system operations, phase 3 module 1312 categorizes SSS events into three categories. Those categories are independent events, simple dependent events, and complex dependent events. An independent event is an event whose path has no events in the other file system. For example, a local SSS event is independent if there are no remote SSS events for the same path. Similarly, a remote SSS event is independent if there are no local SSS events for its path. All other SSS events are dependent events. A simple dependent event is a local SSS event for whose path there is only one remote SSS event. Similarly, a simple dependent event is also a remote SSS event for whose path there is only one local SSS event. An event that is not independent or simple dependent is complex dependent.

Phase 3 module 1312 generates file system operations directly for independent events. However, phase 3 module 1312 relies on the conflict resolution of phase 2 to generate file system operations for simple dependent events. For complex dependent events, phase 3 module 1312 collects the paths of the complex dependent events for rescan synchronizations of those paths. Phase 3 module 1312 can also initiates the rescan synchronizations, for example, with synchronizer 816 directly or in the operations stream.

The following are some examples of file system operations being generated based on the processed local and remote SSS events during phase 2 and phase 3.

(1) LFS UPDATE A+RFS UNLINK B=Push file A+Delete file B
(2) LFS RENAME A to B+RFS RENAME A to C=Push file B+Pull file C
(3) LFS MKDIR A+RFS UNLINK B+RFS RMDIR C=Push folder A+Delete file B+Delete folder C In the above examples, the operations for example (1) are generated by phase 3 module 1312, the operations for example (2) are generated by phase 2 module 1310, and the operations of example (3) are generated by phase 3 module 1312. Phase 3 module 1312 would assemble these file system operations into an operation output stream, along with any other file system operations generated based on the SSS events processed in phases 0-3 that were not deleted, and provide that stream to sync action handler 826.

The following is pseudo-code to implement phase 3 processing:

```
gen_op(event):
    generate_operation(event)
    mark_as_processed(event)
collect_lrs_paths(event):
    collect the Limited Rescan Sync paths for event and all of its
        dependent events
    mark_as_processed(event and all its dependent events)
generate_operations(LFS events, RFS events)
    sort LFS and RFS events by timestamp
    for lfs_event in all non-processed LFS events:
        if is_independent_event(lfs_event): gen_op(lfs_event)
        elif is_simple_dependent_event(lfs_event):
            rfs_dep_event = get_dependent_event(lfs_event)
            for rfs_event in non-processed RFS events with
                timestamp < timestamp(rfs_dep_event):
                if is_independent_event(rfs_event):
                    gen_op(rfs_event)
                else:
                    collect_lrs_paths(rfs_event)
            generate operations for simple dependent LFS/RFS events
                according to the LFS/RFS event conflict resolution tables
                presented in phase 2
        else: # the LFS event has more than one dependency
            collect_lrs_paths(lfs_event)
    # process the remainder of RFS events
    for rfs_event in all non-processed RFS events:
        gen_op(rfs_event)
ops = generate_operations(LFS events, RFS events)
performs_actions(ops)
if limited_rescan_sync_path_list is not empty:
    perform LRS on the limited_rescan_sync_path_list
```

The file system operations available for output by SSS processor 1104 will be determined by the application interfaces and file system protocols being used. However, it is expected that file system operations such as push, pull, delete, move, rename, merge, etc. will be widely employed. Additionally, there might be iterations of the file system operations in use, which distinguish their applicability to RFS 202 and the other to LFS 204. As yet another example, pulling a file might also result in a prior version of the file being pushed to the opposite file system for versioning purposes as described above. Still further, the file system operations that are used can also include operations to carry out or trigger other processes (e.g., modification of LVS database 209, etc.).

Some methods of the present invention will now be described with reference to FIGS. 14-20. For the sake of clear explanation, these methods might be described with reference to particular elements discussed herein that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 14:
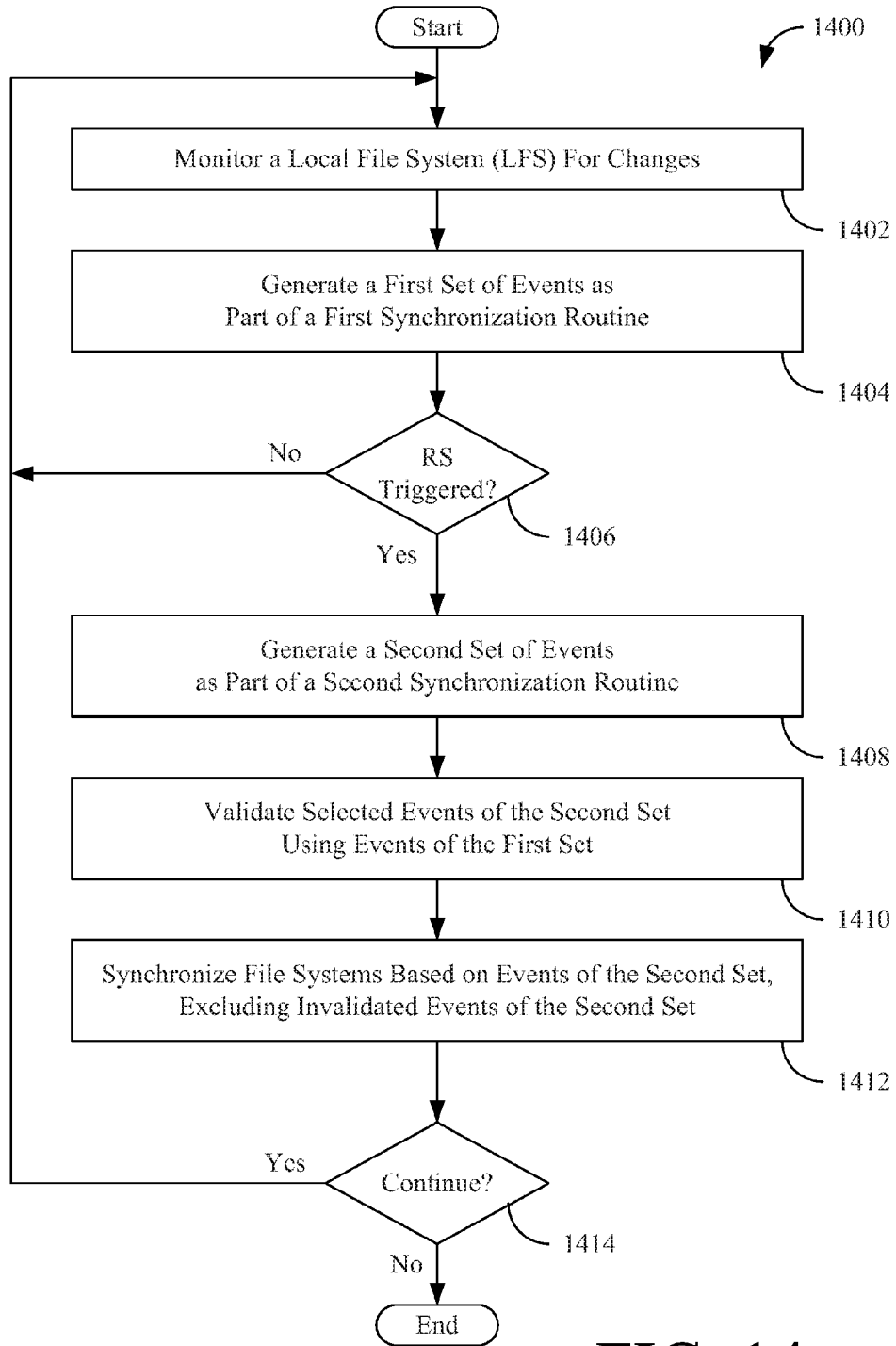
FIG. 14 is a flowchart summarizing a method for synchronizing a local file system and a remote file system according to the present invention.

FIG. 14 is a flowchart 1400 summarizing one method 1400 employed by a local cloud server (e.g., local cloud server 104) for synchronizing a local file system (LFS) and a remote file system (RFS) located remotely from the LFS. In a first step 1402, LFS 204 is monitored for changes made to LFS 204, for example, by one or more local users 110. In a second step 1404, a first set of events (e.g., local SSS events 216, remote SSS events 214, etc.) are generated as part of a first synchronization routine (e.g., steady state synchronization, SSS) at least partially in response to the changes being made to LFS 204. In a third step 1406, it is determined if a rescan synchronization (RS) has been triggered, for example, during the synchronization routine based on the first set of events. If so, then in a fourth step 1408, a second set of events are generated as part of a second synchronization routine (e.g., a rescan synchronization). In a fifth step 1410, selected ones of the second set of events (e.g., those indicative of a file or folder being deleted) are validated using at least some of the events of the first set, to determine whether each of the selected events of the second set is valid or invalid. Then, in a sixth step 1412, portions of the LFS and the RFS are synchronized based on the events of the second set, excluding those events of the second set that were invalidated. Then, in a seventh step 1414, the local cloud server 104 determines if the method 1400 should continue, and if so, method 1400 returns to first step 1402. Otherwise, method 1400 ends. Additionally, if in third step 1406 an RS has not been triggered, then method 1400 also returns to first step 1402, optionally after completing synchronization based on the first synchronization routine.

Figure 15:
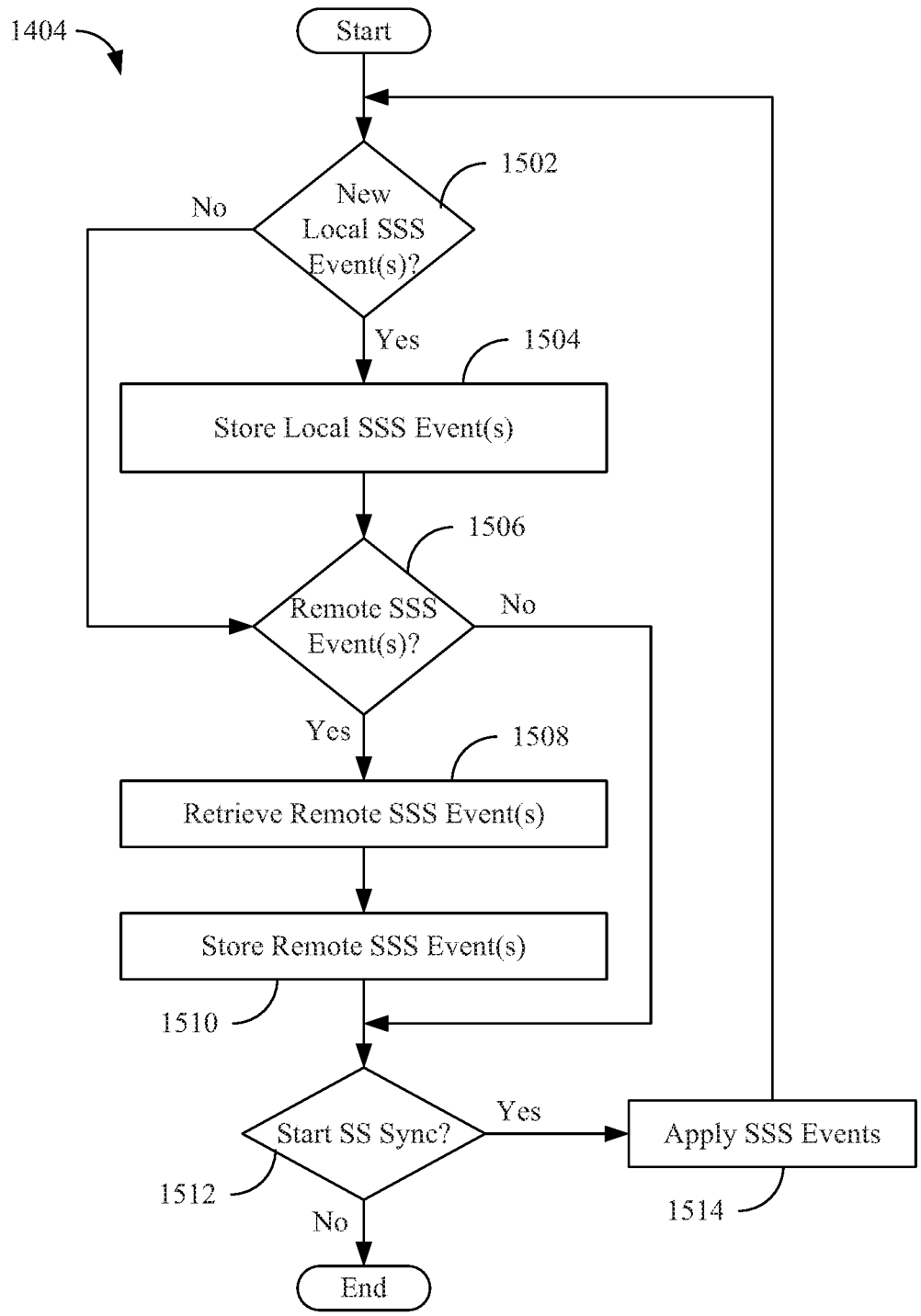
FIG. 15 is a flowchart summarizing a method of performing the second step of the method of FIG. 14.

FIG. 15 is a flowchart summarizing one method for performing the second step 1404 (generate a first set of events) according to the present invention. In a first step 1502, local data monitor 810 determines if a new local SSS event(s) 216 has/have occurred. If so, then local data monitor 810 stores information about the new local SSS event(s) 216 in local SSS event database 812 (e.g., by storing data in each of events table 1002, file systems table 1004, and renames table 1006) in a second step 1504. Once the local SSS event(s) 216 are stored, or if there are no local SSS events 216 in step 1502, then the method proceeds to a third step 1506. In third step 1506, local synchronizer 816 checks with remote cloud server 102, via remote cloud interface 818, for new remote SSS event(s) 214 that have occurred on RFS 202. If remote SSS events 214 have occurred, then in a fourth step 1508 local synchronizer 816 retrieves information about the new remote SSS events 214 from remote cloud server 102 and stores the remote SSS events 214 in remote SSS event database 820 (e.g., by storing data in each of events table 1002, file systems table 1004, and renames table 1006) in a fifth step 1510. The method then proceeds to a sixth step 1512 where local synchronizer 816 determines if steady state synchronization should start for a particular event synchronization period. If yes, then the remote and local SSS events 214 and 216 are processed by event processor 824 and applied using file system operations to the appropriate ones of RFS 202 and LFS 204 in a seventh step 1514, and then the method returns to first step 1502. Otherwise, the method ends.

Figure 16:
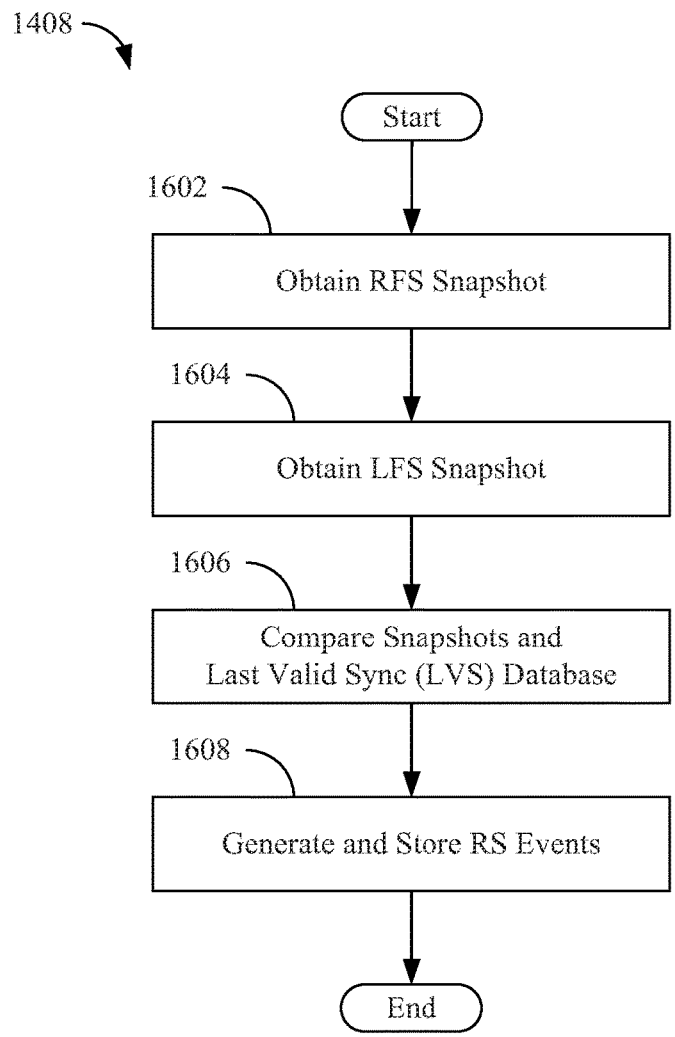
FIG. 16 is a flowchart summarizing a method of performing the fourth step of the method of FIG. 14.

FIG. 16 is a flowchart summarizing one method for performing the fourth step 1408 (generate a second set of events), responsive to an RS (e.g., an FRS or LRS) being triggered, according to the present invention. In first step 1602, local synchronizer 816 obtains an RFS snapshot 206 of RFS metadata 606 from remote cloud server 102 and stores the RFS snapshot 206 as a file in LFS 204. Local synchronizer 816 then obtains an LFS snapshot 208 of LFS metadata 806 and stores the LFS snapshot 208 as a file in LFS 204 in a second step 1604. Then, in a third step 1606, local synchronizer 816 compares the RFS snapshot 206, the LFS snapshot 208, and the attributes data in LVS database 209 and, in a fourth step 1608, generates and stores remote RS events 210 and local RS events 212 in remote RS events database 830 and local RS events database 832, respectively, based on the comparison in step 1606.

Figure 17:
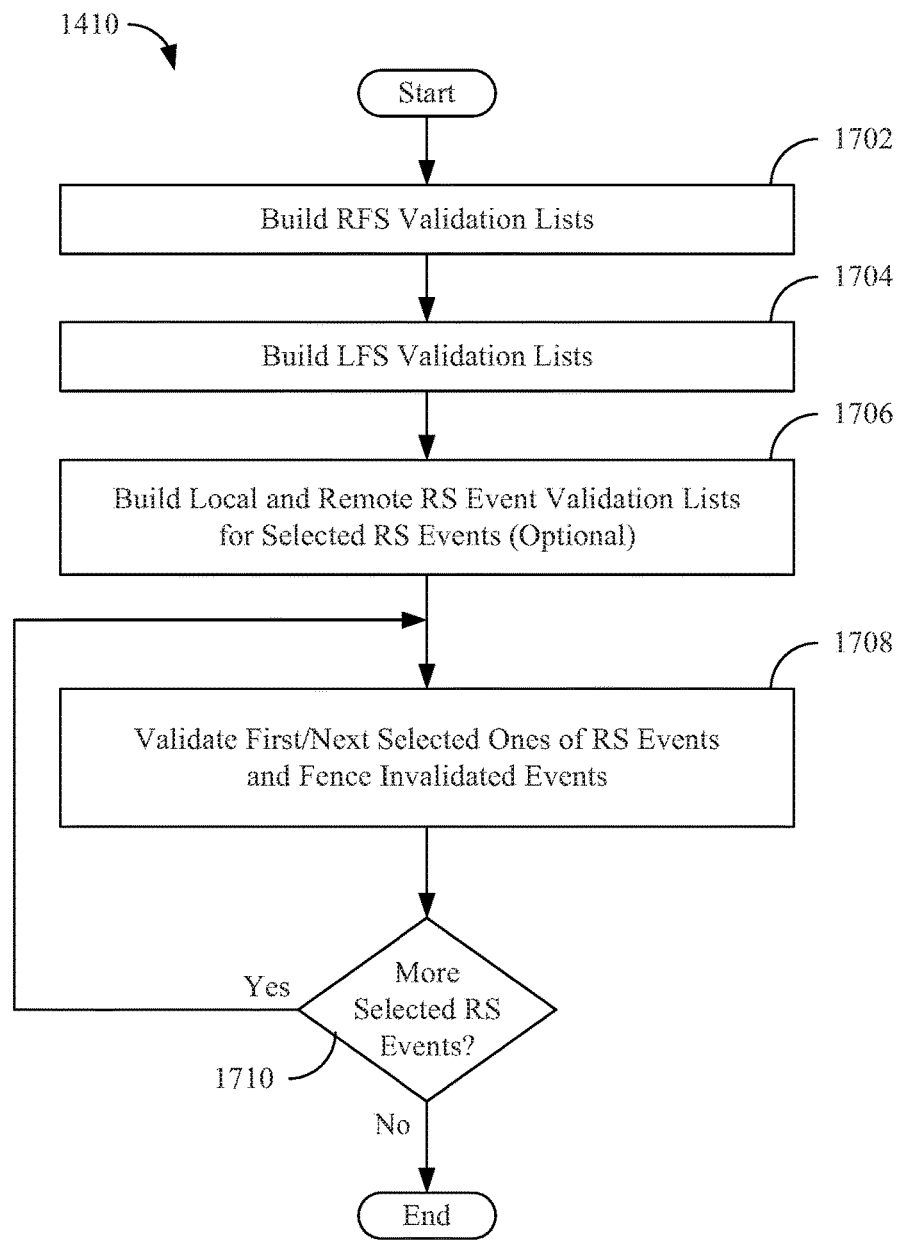
FIG. 17 is a flowchart summarizing a method of performing the fifth step of the method of FIG. 14.

FIG. 17 is a flowchart summarizing one method for performing fifth step 1410 (validate selected RS events using SSS events) according to the invention. In a first step 1702, RFS validation list generator 1202 of RS event processor 1102 builds a plurality of RFS delete validation lists (e.g., RFS UNLINK validation list 406 and RFS RMDIR validation list 408) based on the available remote SSS events 214. Similarly, in a second step 1704, LFS validation list generator 1204 of RS event processor 1102 builds a plurality of LFS delete validation lists (e.g., LFS UNLINK validation list 410 and RFS RMDIR validation list 412) based on the available local SSS events 216. In an optional third step 1706, RS event fencer 1206 of RS event processor 1102 can build one or more RS event validation lists (e.g., RS event validation lists 1210, 1212, 1214, and 1216) containing the selected remote RS events 210 and selected local RS events 212 that need to undergo validation (e.g., remote and local RS delete file and delete folder events). Then, in a fourth step 1708, RS event fencer 1206 validates a first/next one of the selected remote and local RS events 210 and 212 (optionally compiled in the RS event validation lists 1210, 1212, 1214, and 1216) against the associated RFS validation lists 406 and 408 or LFS validation lists 410 and 412. If the selected RS event is a remote RS event 210, then the selected remote RS event 210 is validated against one of the RFS validations lists 406 and 408 built in step 1702. Otherwise, if the selected RS event is a local RS event 212, then the selected local RS event 212 is validated against one of the LFS validations lists 410 and 412 built in step 1704. Subsequently, in a fifth step 1710, RS event fencer 1206 determines if there are more RS events to validate. If so, the method returns to step 1708. Otherwise, the method ends.

Figure 18:
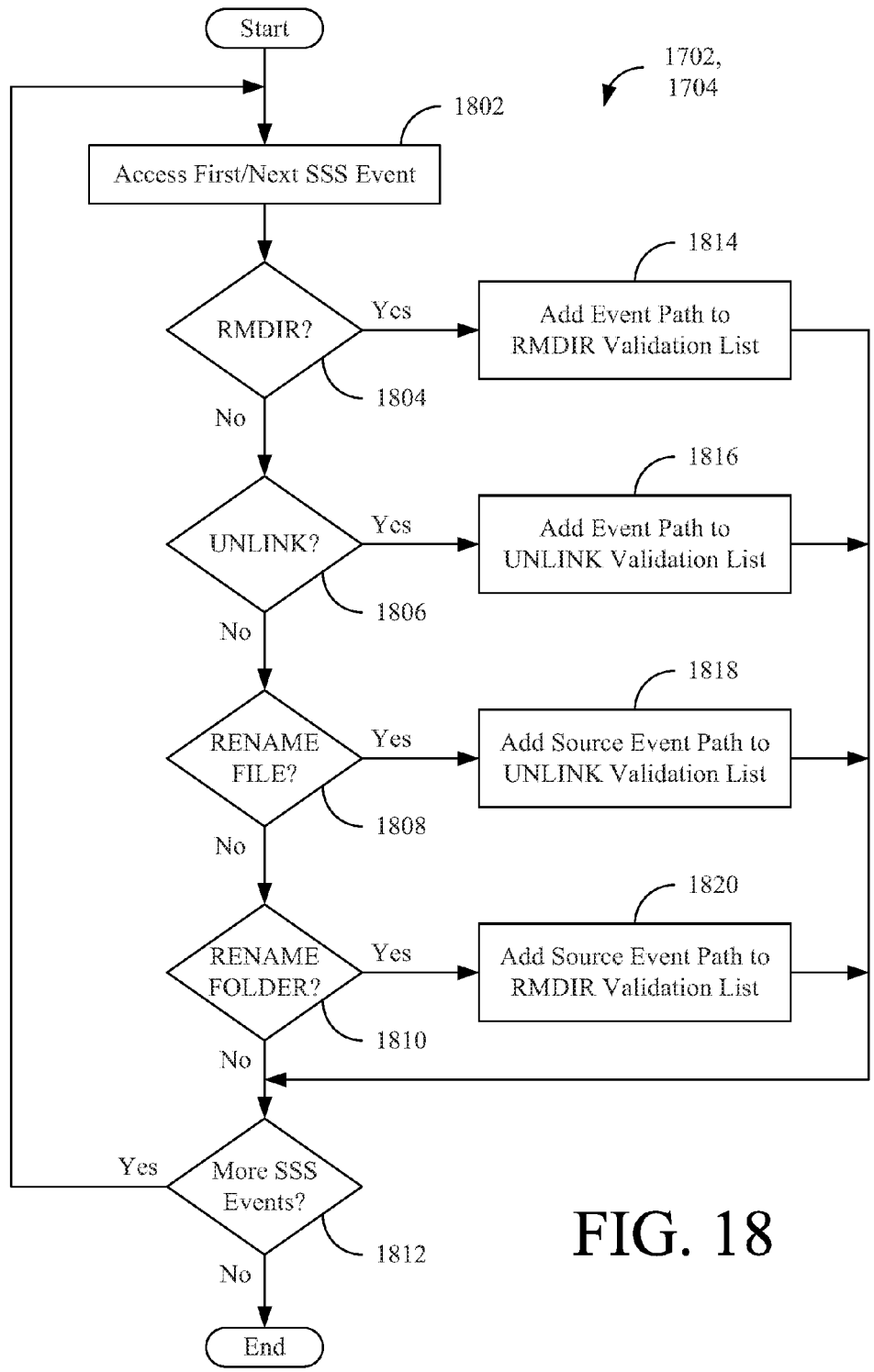
FIG. 18 is a flowchart summarizing a method of performing the first and second steps of the method of FIG. 17.

FIG. 18 is a flowchart summarizing one method for performing either step 1702 (build RFS validation lists) or step 1704 (build LFS validation lists) of the method of FIG. 17. The following description will be made based on step 1702 of FIG. 17, but applies similarly to step 1704. In a first step 1802, RFS validation list generator 1202 accesses a first/next remote SSS event 214 from one of remote SSS event database 820 and remote SSS event view database 822. Then, in a second step 1804, RFS validation list generator 1202 determines if the accessed remote SSS event 214 is a delete folder (RMDIR) event. If not, then in a third step 1806, generator 1202 determines if the accessed remote SSS event 214 is a delete file (UNLINK) event. If not, then in a fourth step 1808, generator 1202 determines if the accessed remote SSS event 214 is a rename file (RENAME_FILE) event. If not, then in a fifth step 1810, generator 1202 determines if the accessed remote SSS event 214 is a rename folder (RENAME_FOLDER) event. If not, then in a sixth step 1812, generator 1202 determines if there are more remote SSS events 214 in remote SSS event database 820 and/or remote SSS event view database 822. If so, generator 1202 returns to step 1802 and accesses the next remote SSS event 214. Otherwise, the method ends.

However, if in second step 1804 the RFS validation list generator 1202 determines that the remote SSS event 214 is a RMDIR event, then generator 1202 adds the path (e.g., canonical path 1012) of the remote SSS event 214 to RFS RMDIR validation list 408 and then proceeds to step 1812. Similarly, if in third step 1806, generator 1202 determines that the remote SSS event 214 is an UNLINK event, then generator 1202 adds the path (e.g., canonical path 1012) of the remote SSS event 214 to RFS UNLINK validation list 406 and then proceeds to step 1812. If in fourth step 1808 generator 1202 determines that the remote SSS event 214 is a RENAME_FILE event, then generator 1202 adds the source path (e.g., canonical path 1012) of the renamed file to RFS UNLINK validation list 406 and then proceeds to step 1812. Similarly, if in fifth step 1810, generator 1202 determines that the remote SSS event 214 is a RENAME_FOLDER event, then generator 1202 adds the source path (e.g., canonical path 1012) of the renamed folder to RFS UNLINK validation list 408 and then proceeds to step 1812.

While FIG. 18 is described with respect to step 1702 of FIG. 17, the process is similar for step 1704. In such a case, LFS validation list generator 1204 accesses the first/next local SSS events 216 from local SSS event database 812 and/or local SSS event view database 814 and builds LFS UNLINK validation list 410 and LFS RMDIR validation list 412 as described above.

Figure 19:
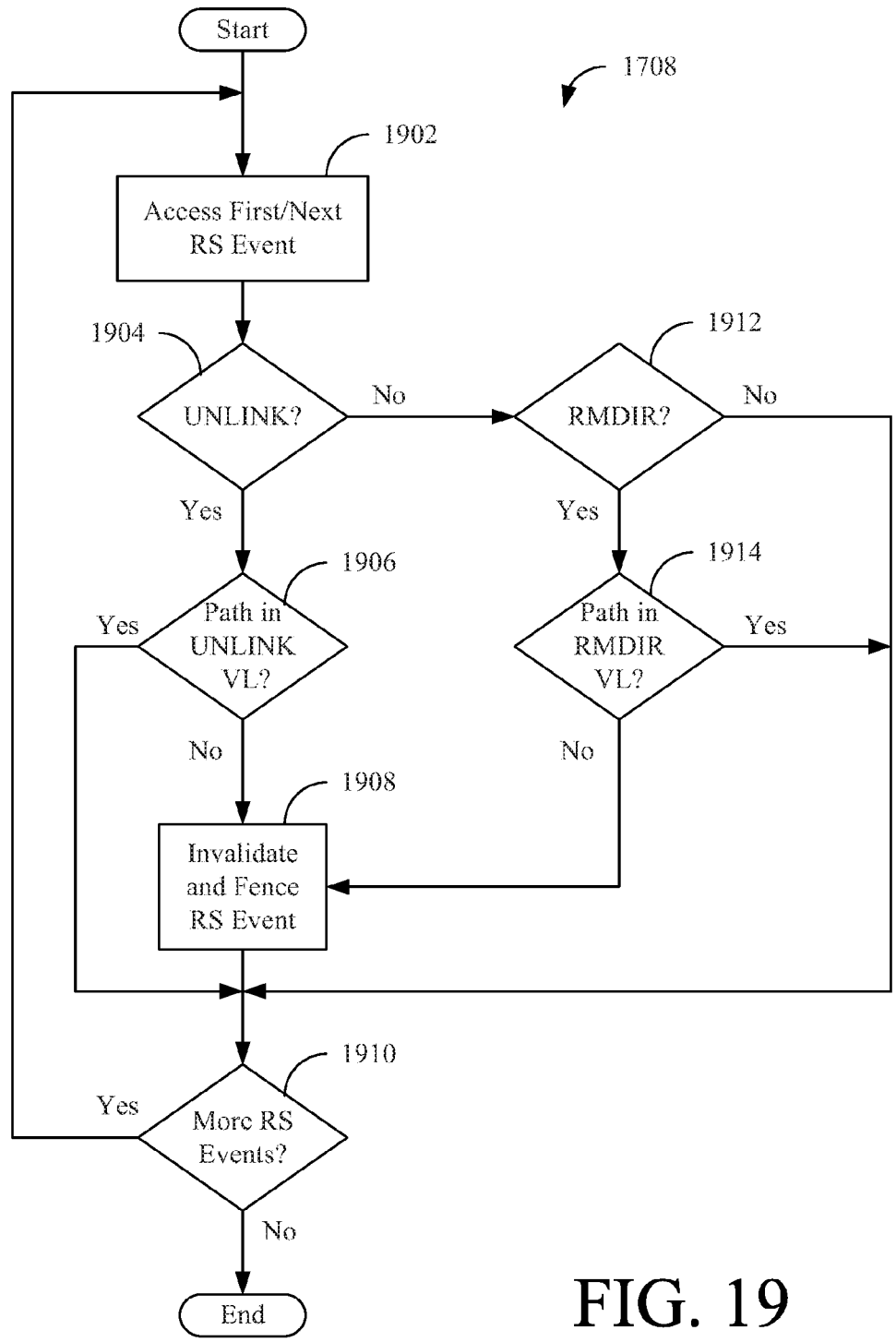
FIG. 19 is a flowchart summarizing a method of performing the fourth step of the method of FIG. 17.

FIG. 19 is a flowchart summarizing one method for performing step 1708 (validate selected RS events and fence invalidated RS events) of the method of FIG. 17. In a first step 1902, RS event fencer 1206 accesses a first/next RS event either by accessing one of RS databases 830 or 832 or an RS event validation list (e.g., any of RS event validation lists 1210, 1212, 1214, and 1216). Then, in a second step 1904, RS event fencer 1206 determines if the accessed RS event is a delete file (UNLINK) event. If so, then in a third step 1906, RS event fencer 1206 determines if the path of the delete file RS event has a corresponding path in the UNLINK validation list for the associated file system. If the RS event is a remote RS event 210, then RS event fencer 1206 would check the path of the remote RS event 210 against the paths in RFS UNLINK validation list 406. Similarly, if the RS event is a local RS event 212, then RS event fencer 1206 would check the path of the local RS event 212 against the paths in LFS UNLINK validation list 410. If the path of the RS delete file event is not in the UNLINK validation list, then in a fourth step 1908, RS delete fencer 1206 invalidates and fences the RS delete file event, for example, by deleting the RS event, by modifying a valid/invalid flag to reflect invalid status, etc. Then in a fifth step 1910, RS event fencer 1206 determines if there are more RS events. If so, the method returns to first step 1902. If not, then the method ends.

If in third step 1906, however, RS event fencer 1206 determines that the path of the delete file RS event has a corresponding path in the associated UNLINK validation list, then the method proceeds to step 1910 such that the RS event will be further used for synchronization. In that sense, the particular RS event is validated.

Returning to second step 1904, if RS event fencer 1206 determines that the accessed RS event is not an UNLINK event, then the method proceeds to a sixth step 1912. In step 1912, RS event fencer 1206 determines if the accessed RS event is a delete folder (RMDIR) event. If so, then in a seventh step 1914, RS event fencer 1206 determines if the path of the RS delete folder event has a corresponding path in the associated RMDIR validation list. If the RS event is a remote RS event 210, then RS event fencer 1206 would check the path of the remote RS event 210 against the paths in RFS RMDIR validation list 408. Similarly, if the RS event is a local RS event 212, then RS event fencer 1206 would check the path of the local RS event 212 against the paths in the LFS RMDIR validation list 412. If the path of the RS delete folder event is not in the associated RMDIR validation list, then the method proceeds to fourth step 1908 and the RS delete folder event in question is invalidated and fenced, for example, by deleting the RS event, by modifying a valid/invalid flag to reflect invalid status, etc.

If, however, RS event fencer 1206 determines in seventh step 1914 that the path of the delete folder RS event has a corresponding path in the associated RMDIR validation list, then the method proceeds to step 1910 such that the RS delete folder event will be used for synchronization. In this sense, the RS delete folder event is validated.

Similarly, if in sixth step 1912, RS delete fencer 1206 determines that the accessed RS event is not a delete folder event, then the method proceeds to fifth step 1910 such that the particular RS event will be further used for synchronization. As will be apparent from the above description, the invention selects delete file and delete folder RS events that have been generated during an RS and subjects them to validation against the corresponding UNLINK and RMDIR validation lists.

It should be noted that employing RS event validation lists 1210, 1212, 1214, and 1216 can simplify the process shown in FIG. 19, because the RS events that need to be validated are already compiled into the RS event validation lists. Accordingly, comparisons of RS event validation lists 1210, 1212, 1214, and 1216 with RFS UNLINK validation list 406, RFS RMDIR validation list 408, LFS UNLINK validation list 410, and LFS RMDIR validation list 412, respectively, could be directly made.

Figure 20:
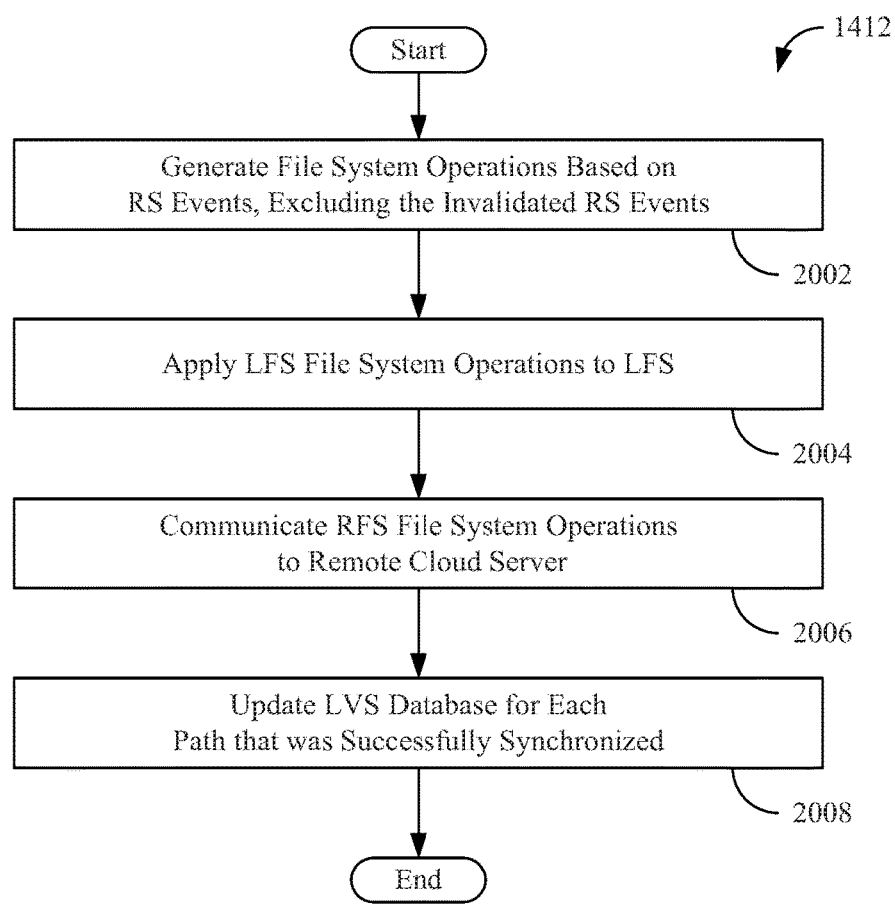
FIG. 20 is a flowchart summarizing a method of performing the sixth step of the method of FIG. 14.

FIG. 20 is a flowchart summarizing a method of performing the sixth step 1412 (synchronize file systems excluding invalidated events) of FIG. 14. In a first step 2002, FSO generator 1208 of RS event processor 1102 generates file system operations based on the remote and local RS events 210 and 212, excluding those remote and local RS events 414 and 416 that were invalidated and fenced by RS event fencer 1206, and then outputs the file system operations to sync actions handler 826. In a second step 2004, sync actions handler 826 applies the received file system operations to LFS 204 using sync server APIs 828 and LFS handler 802. In a third step 2006, sync actions handler 826 communicates file system operations to be applied to RFS 202 to remote cloud interface 818 (or to local synchronizer 816) such that they are communicated to remote cloud server 102 and utilized there. In a fourth step 2008, sync operations handler 826 and/or local synchronizer 816 updates LVS database 209 as each path on LFS 204 and RFS 202 (whether for folder or file object) is successfully synchronized.

The description of particular embodiments of the present invention is now complete. Many of the described features may be substituted, altered or omitted without departing from the scope of the invention. For example, functional modules described with respect to the local cloud server can also be implemented in the remote cloud server, for example, if the remote cloud server carried our snapshot-based synchronizations. As another example, while the particular lists that are built for validation purposes are intended to improve validation and fencing efficiency, each RS event could be validated against the SSS events directly. As still another example, alternative data structures for events, file system metadata, and the LVS database could be employed as desired. As yet another example, file system operations that are generated as part of a rescan synchronization routine could be validated against the SSS events and fenced, as opposed to validating the RS events. These and other deviations from the particular embodiments shown will be apparent to those skilled in the art, particularly in view of the foregoing disclosure.

We claim:

1. In a local file storage system, a method for synchronizing a local file system (LFS) and a remote file system (RFS) located remotely from said LFS, said method comprising:
    monitoring said LFS for changes made to said LFS;
    generating a first set of events as part of a first synchronization routine, at least some of said events of said first set being generated responsive to one of said changes being made to said LFS;
    synchronizing a portion of said LFS and said RFS based on said events of said first set;
    generating a second set of events as part of a second synchronization routine for synchronizing at least a portion of said LFS with a corresponding portion of said RFS;
    validating selected ones of said events of said second set with at least some of said events of said first set to determine whether each of said selected events of said second set is valid or invalid; and
    synchronizing portions of said LFS and said RFS based on said events of said second set excluding events of said second set determined to be invalid; and wherein
    said second synchronization routine comprises a snapshot-based synchronization process operative to compare at least a portion of said LFS with a corresponding portion of said RFS for changes between said LFS and said RFS; and
    each of said events of said second set is associated with one of said changes.

2. The method of claim 1, further comprising discarding ones of said selected events of said second set that are determined to be invalid.

3. The method of claim 1, wherein said step of synchronizing portions of said LFS and said RFS based on said events of said second set includes ignoring ones of said events of said second set that are determined to be invalid.

4. The method of claim 1, wherein said step of synchronizing portions of said LFS and said RFS based on said events of said second set includes:
   generating file system operations based on said events of said second set; and
   discarding file system operations generated based on invalid ones of said selected events of said second set.

5. The method of claim 1, wherein said selected events of said second set comprise ones of said events of said second set associated with deleting a file system object.

6. The method of claim 5, wherein said step of validating said selected events of said second set includes invalidating each of said selected events of said second set that would result in a file system object being mistakenly deleted during synchronization.

7. The method of claim 6, wherein said step of validating selected events of said second set includes:
   determining that a first event of said second set is indicative of a first file system object having been deleted from said LFS such that synchronization based on said first event of said second set would result in a corresponding first file system object being deleted from said RFS; and
   determining if at least one of said events of said first set confirms that said first file system object was deleted from said LFS.

8. The method of claim 7, wherein said step of validating selected events of said second set includes determining that said first event of said second set is invalid if none of said events of said first set indicates that said first file system object was deleted from said LFS.

9. The method of claim 6, further comprising:
   establishing a connection with a remote file storage system having access to said RFS;
   receiving additional events of said first set from said remote file storage system, each of said additional events of said first set having been generated responsive to a change made to said RFS; and wherein
   said step of validating selected events of said second set includes validating at least some of said selected events of said second set with at least some of said additional events of said first set received from said remote file storage system.

10. The method of claim 9, wherein said step of validating selected events of said second set includes:
   determining that a first event of said second set is indicative of a first file system object having been deleted from said RFS such that synchronization based on said first event of said second set would result in a corresponding first file system object being deleted from said LFS; and
   determining if at least one of said additional events of said first set confirms that said first file system object was deleted from said RFS.

11. The method of claim 1, further comprising building at least one validation list based on at least some of said events of said first set.

12. The method of claim 11, further comprising:
   establishing a connection with a remote file storage system having access to said RFS; and
   receiving additional events of said first set from said remote file storage system, each of said additional events of said first set having been generated responsive to a change made to said RFS; and wherein
   said step of validating selected ones of said events of said second set includes
   building a first plurality of validation lists based on said events of said first set that are generated as changes are made to said LFS and
   building a second plurality of validation lists based on said additional events of said first set that are generated as changes are made to said RFS.

13. The method of claim 11, further comprising building a first validation list based on file events of said first set and building a second validation list based on folder events of said first set.

14. The method of claim 13, wherein:
   said first validation list is populated based on events of said first set that are associated with file deletes and file renames; and
   said second validation list is populated based on events of said first set that are associated with folder deletes and folder renames.

15. A local file storage system having access to a local file system (LFS), said local file storage system comprising:
   memory for storing said LFS and code;
   at least one processing unit for executing said code;
   a client interface operative to enable one or more local users to access said LFS;
   a remote cloud interface operative to communicate with a remote file storage system having access to a remote file system (RFS);
   an LFS module operative to monitor for changes being made to said LFS and to output local event information about each of said changes;
   a data monitor operative to generate a first set of events responsive to said local event information, each of said events of said first set being generated as part of a first synchronization routine;
   a rescan synchronizer operative to generate a second set of events as part of a second synchronization routine for synchronizing at least a portion of said LFS with a corresponding portion of said RFS; and
   an event processor operative to
      synchronize a portion of said LFS and said RFS based on events of said first set,
      validate selected ones of said events of said second set with at least some of said events of said first set to determine whether each of said selected events of said second set is valid or invalid, and
      generate file system operations to synchronize portions of said LFS and said RFS based on said events of said second set excluding events of said second set determined to be invalid; and wherein
   said second synchronization routine comprises a snapshot-based synchronization process operative to compare at least a portion of said LFS with a corresponding portion of said RFS for changes between said LFS and said RFS; and
   each of said events of said second set is associated with one of said changes.

16. The local file storage system of claim 15, wherein said event processor is operative to discard ones of said selected events of said second set determined to be invalid.

17. The local file storage system of claim 15, wherein said event processor is operative to ignore ones of said selected events of said second set determined to be invalid.

18. The local file storage system of claim 15, wherein said event processor is operative to discard synchronization operations generated based on invalid ones of said selected events of said second set.

19. The local file storage system of claim 15, wherein said selected events of said second set comprise ones of said events of said second set that are associated with deleting a file system object on at least one of said LFS and said RFS.

20. The local file storage system of claim 19, wherein said event processor is operative to invalidate each of said selected events of said second set that would result in a file system object being mistakenly deleted during synchronization.

21. The local file storage system of claim 20, wherein said event processor is further operative to:
   determine that a first event of said second set is indicative of a first file system object having been deleted from said LFS such that synchronization based on said first event of said second set would result in a corresponding first file system object being deleted from said RFS; and
   determine if at least one of said events of said first set confirms that said first file system object was deleted from said LFS.

22. The local file storage system of claim 21, wherein said event processor is further operative to invalidate said first event of said second set if none of said events of said first set indicates that said first file system object was deleted from said LFS.

23. The local file storage system of claim 20, wherein:
   said remote cloud interface is operative to receive additional events of said first set from said remote file storage system, each of said additional events of said first set having been generated responsive to a change made to said RFS; and
   said event processor is operative to validate at least some of said selected events of said second set using said additional events of said first set received from said remote file storage system.

24. The local file storage system of claim 23, wherein said event processor is further operative to:
   determine that a first event of said second set is indicative of a first file system object having been deleted from said RFS such that synchronization based on said first event of said second set would result in a corresponding first file system object being deleted from said LFS; and
   determine if at least one of said additional events of said first set confirms that said first file system object was deleted from said RFS.

25. The local file storage system of claim 15, further comprising a validation list generator operative to build at least one validation list based on at least some of said events of said first set.

26. The local file storage system of claim 25, wherein:
   said remote cloud interface is operative to receive additional events of said first set from said remote file storage system, each of said additional events of said first set having been generated responsive to a change made to said RFS; and
   said validation list generator is operative to build a first plurality of validation lists based on said events of said first set that were generated responsive to changes made to said LFS and to build a second plurality of validation lists based on said additional events of said first set that were generated responsive to changes made to said RFS.

27. The local file storage system of claim 25, wherein said validation list generator is operative to build a first validation list based on file events of said first set and to build a second validation list based on folder events of said first set.

28. The local file storage system of claim 27, wherein:
   said first validation list is populated based on events of said first set that are associated with file deletes and file renames; and
   said second validation list is populated based on events of said first set that are associated with folder deletes and folder renames.

29. A local file storage system having access to a local file system (LFS), said local file storage system comprising:
   memory for storing said LFS and code;
   at least one processing unit for executing said code;
   a client interface operative to enable one or more local users to access said LFS;
   a remote cloud interface operative to communicate with a remote file storage system having access to a remote file system (RFS);
   an LFS module operative to monitor for changes being made to said LFS and to output local event information about each of said changes;
   a data monitor operative to generate a first set of events responsive to said local event information, each of said events of said first set being generated as part of a second synchronization routine;
   a steady-state synchronizer operative to synchronize a portion of said LFS and said RFS based on said events of said first set
   a rescan synchronizer operative to generate a second set of events as part of a second synchronization routine for synchronizing at least a portion of said LFS with a corresponding portion of said RFS;
   means for fencing events of said second set that would result in file system objects of at least one of said LFS and said RFS being mistakenly deleted during synchronization; and
   means for synchronizing portions of said LFS and said RFS based on said events of said second set.

30. A non-transitory electronically-readable storage media having code embodied thereon for causing at least one electronic device to synchronize a local file system (LFS) and a remote file system (RFS) located remotely from said LFS, said code being operative to cause said at least one electronic device to:
   monitor said LFS for changes made to said LFS;
   generate a first set of events as part of a first synchronization routine, at least some of said events of said first set being generated responsive to one of said changes being made to said LFS;
   synchronize a portion of said LFS and said RFS based on said events of said first set;
   generate a second set of events as part of a second synchronization routine for synchronizing at least a portion of said LFS with a corresponding portion of said RFS;
   validate selected ones of said events of said second set with at least some of said events of said first set to determine whether each of said selected events of said second set is valid or invalid; and
   synchronize portions of said LFS and said RFS based on said events of said second set excluding events of said second set determined to be invalid; and wherein said second synchronization routine comprises a snapshot-based synchronization process operative to compare at least a portion of said LFS with a corresponding portion of said RFS for changes between said LFS and said RFS; and each of said events of said second set is associated with one of said changes.

\* \* \* \* \*